(12) United States Patent
Ishii

(10) Patent No.: US 7,469,093 B2
(45) Date of Patent: Dec. 23, 2008

(54) DATA PROCESSING APPARATUS FOR PROCESSING PLAYBACK DESCRIPTION DATA

(75) Inventor: Yoshiki Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1199 days.

(21) Appl. No.: 10/042,324

(22) Filed: Jan. 11, 2002

(65) Prior Publication Data
US 2002/0097449 A1    Jul. 25, 2002

(30) Foreign Application Priority Data
Jan. 19, 2001 (JP) ............... 2001-011768
Jul. 12, 2001 (JP) ............... 2001-212034

(51) Int. Cl.
*G11B 27/00* (2006.01)
*H04N 5/931* (2006.01)

(52) U.S. Cl. ................... 386/52; 386/55
(58) Field of Classification Search ........... 386/52, 386/55, 64
See application file for complete search history.

(56) References Cited

U.S. PATENT DOCUMENTS

| | | | | |
|---|---|---|---|---|
| 4,972,274 A * | 11/1990 | Becker et al. | ............. | 386/55 |
| 5,206,929 A * | 4/1993 | Langford et al. | ............. | 715/723 |
| 5,559,562 A * | 9/1996 | Ferster | ............. | 348/584 |
| 5,721,856 A * | 2/1998 | Takeuchi | ............. | 711/1 |
| 5,974,220 A * | 10/1999 | Kajimoto | ............. | 386/52 |
| 6,339,668 B1 * | 1/2002 | Schmidt et al. | ............. | 386/52 |
| 6,658,196 B2 * | 12/2003 | Sakai et al. | ............. | 386/55 |

* cited by examiner

*Primary Examiner*—Thai Tran
*Assistant Examiner*—Hung Q Dang
(74) *Attorney, Agent, or Firm*—Fitzpatrick, Cella, Harper & Scinto

(57) ABSTRACT

An apparatus for processing information data and playback description data indicating a playback procedure of the information data newly generates modified information data by using part of the information data, modifies the playback procedure such that the modified information data is played back instead of the part of the information data, and modifies the content of the playback description data in accordance with the modified playback procedure. The playback description data includes playback time information relating to a playback time of the information data. The apparatus modifies the playback time information in accordance with the modified playback procedure.

8 Claims, 26 Drawing Sheets

FIG. 17

<video src="A.mpg"/>

⇩ TITLE ADDED

<video src="title.mpg"rclipFor="title:0s:1.5s"/>
<video src="A.mpg"clipBegin="2s"headShift="2s"/>

FIG. 23
```
<video src="A.mpg"/>
<video src="B.mpg"/>
```
EFFECT ADDED ⇩
```
<video src="A.mpg"clipEnd="2.5s"tailShift="2.5s"/>
<video src="trans.mpg"rclipFor="wipe:0s:1.5s"/>
<video src="A.mpg"clipBegin="2s"headShift="2s"/>
```

EFFECT ATTRIBUTE
WIPE IN
WIPE OUT

```
<video src="A.mpg"clipEnd"2.5s"tailShift="2.5s"/>
<video src="trans.mpg"rclipFor="wipe:0s:1.5s"/>
<video src="B.mpg"clipBegin="2s"headShift="2s"/>
```

FIG. 24

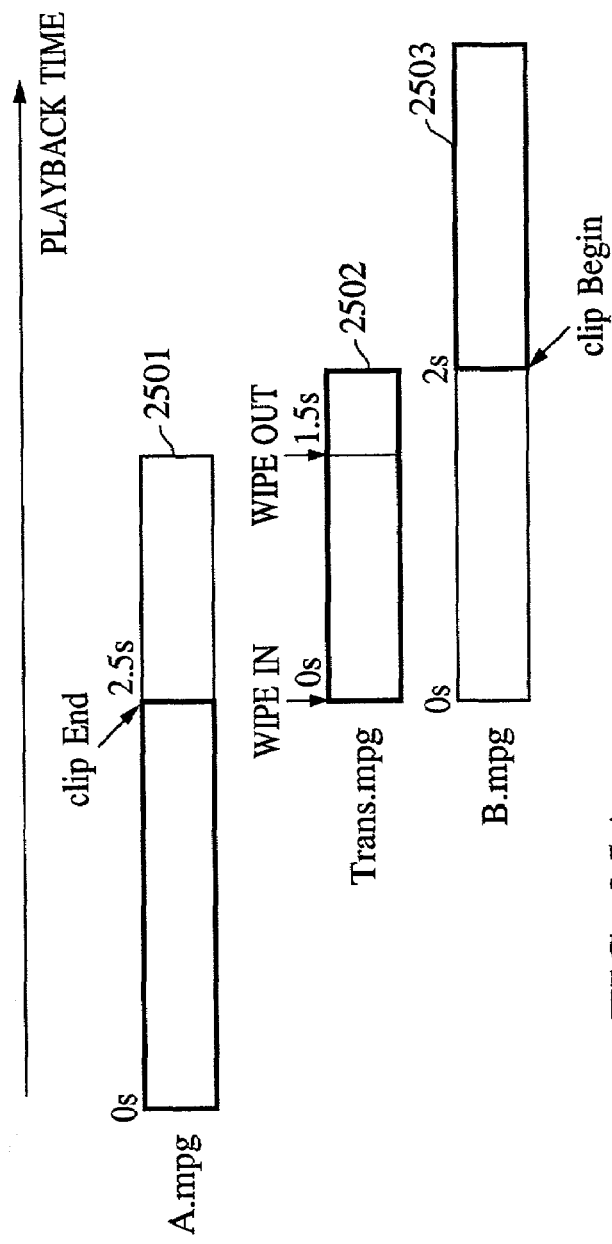
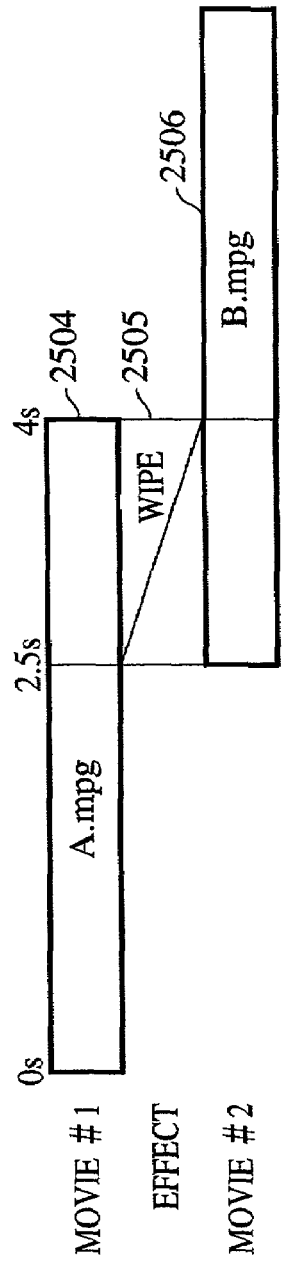
FIG. 25A
FIG. 25B

DATA PROCESSING APPARATUS FOR PROCESSING PLAYBACK DESCRIPTION DATA

BACKGROUND OF THE INVENTION

1. Field of the Invention

The present invention relates to data processing apparatus and more particularly to apparatus for processing information data such as moving image data and audio data by means of playback description data.

2. Description of the Related Art

Apparatus for processing digital image data such as digital videotape recorders and DVD (digital versatile disc) players have become common in recent years. Advances in various audiovisual equipment and computers have also made it possible for amateurs to edit moving images at home.

For example, in a video editing scheme called nonlinear editing as shown in FIG. 13, material data of moving images A 1301 and B 1302 are edited to obtain moving image C 1303. Thus, in the conventional non-linear editing scheme, material moving image data are generally cut-in or cut-out along the time axis, rearranged, or given various effects such as a wipe between cuts, thereby rendering the image and creating new moving image data.

Since the moving image data typically contains a great amount of information, it is in many cases compressed or encoded. When editing such compressed or encoded material data, the data is first decoded, edited and then encoded again.

In recent years, description languages have been proposed for controlling the playback processing of the moving image data or audio data.

An example is the SMIL (synchronized multimedia integration language). The SMIL can specify a synchronous and a consecutive playback of such image data as moving image and stationary image, and a playback processing of other media data including text and audio. It can also specify special effects applied during the switching of image data displays, for example.

In the conventional non-linear editing scheme, additional effects such as wipe and dissolve are effected directly on the image data. This makes it impossible to remove only the added effect or to replace with a different effect later. The scheme is also unable to distinguish the material portion and the portion to which the additional effect processing as been provided.

The playback description languages can be used in adding video effects, the contents of which can be exchanged by rewriting the playback description language.

However, even though the playback description languages such as the SMIL can freely describe playback procedures and special effects, it is sometimes impossible to perform a playback as specified, depending on the actual playback environment in which the playback processing is performed. For instance, some playback environments may hinder a real-time execution of a described special effect and thus disregard the description about the special effect.

Thus, no description schemes have been available which enable the description of highly sophisticated and complex video effects.

SUMMARY OF THE INVENTION

Is an object of the present invention to solve the aforementioned problems of the prior art.

It is another object of the present invention to make it possible to easily modify the playback procedure for the material information data and to easily restore the original material data.

It is a further object of the present invention to enable highly sophisticated and complex effects to be realized regardless of the playback environment.

To achieve the aforementioned objects, an embodiment of the present invention provides an apparatus for processing information data and playback description data indicating a playback procedure of the information data, comprising:

a modified information data processing means for newly generating modified information data by using part of the information data; and a description data processing means for modifying the playback procedure such that the modified information data is played back instead of the part of the information data and modifying the content of the playback description data in accordance with the modified playback procedure, wherein: the playback description data comprises playback time information relating to the playback time of the information data, and wherein the description data processing means is adapted to modify the playback time information in accordance with the modified playback procedure.

It is yet another object of the present invention to enable a section of modified information data in which modification processing is actually provided to be easily identified.

Further objects, features and advantages of the present invention will become apparent from the following description of the preferred embodiments with reference to the attached drawings.

BRIEF DESCRIPTION OF THE DRAWINGS

FIG. 17 shows the playback description data;

FIG. 23 shows the playback description data;

FIG. 24 shows the playback description data;

FIGS. 25A and 25B illustrate the operation of displaying the playback description data;

DESCRIPTION OF THE PREFERRED EMBODIMENTS

Figure 1:
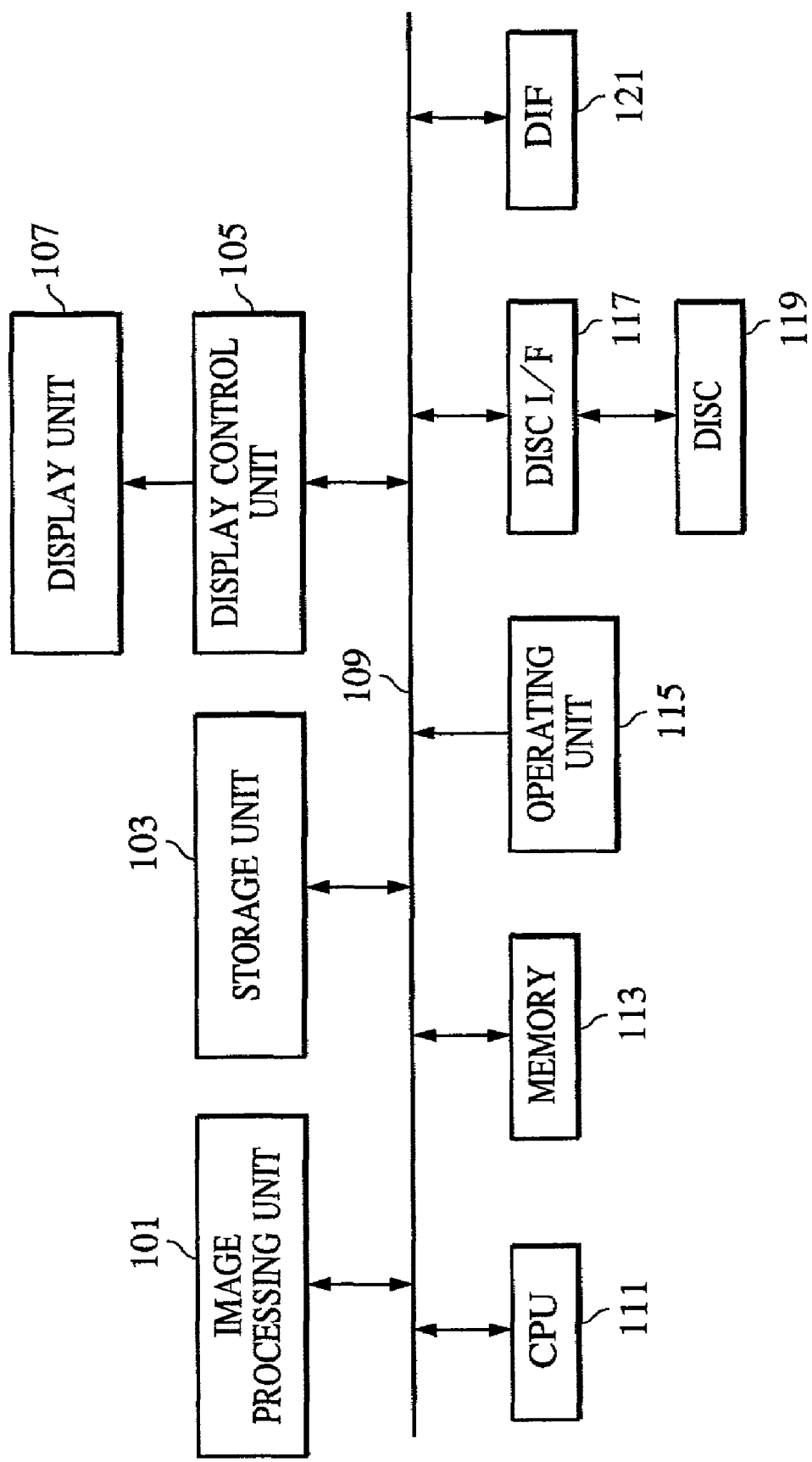
FIG. 1 is a block diagram of an editing apparatus embodying the present invention.

FIG. 1 is a block diagram of an editing apparatus 100 embodying the present invention. The editing apparatus 100 according to the present embodiment is adapted to edit various information such as image and audio information which are encoded by the transport stream of MPEG2 (MPEG2-TS) and recorded on a disc such as a magneto-optic or a hard disc.

In FIG. 1, an image processing unit 101 includes a CODEC unit for encoding and decoding moving image data and audio data. The image processing unit 101 processes the moving image data to generate modified information data. A storage unit 103 comprising a magneto-optic disk or a hard disc stores media data including moving image data and audio data. The storage unit 103 also stores playback description data, as will be mentioned later. A display control unit 105 displays on a display unit 107 images corresponding to image data outputted by the image processing unit 101 or the storage unit 105. The display control unit 105 also displays on the display unit 107 images corresponding to image data played back by a disc 119 via a disc I/F 117. Various menus and an operating panel are also displayed on the display unit 107. Numeral 109 designates a data bus.

The operation of the various units of the apparatus are controlled by a CPU 111. The CPU 111 uses a memory 113 for processing purposes. An operating unit 115 is used for instructing a recording and a playback processing and an edit processing. The operating unit 115 may comprise various keys for recording and playback, etc., or may be formed by a keyboard and mouse. The disc I/F 117 operates to record or play back the playback description data as well as the media data including moving image and audio data on or from the opto-magnetic disk 119. The opto-magnetic disk 119 can be inserted into or ejected from the apparatus 100 via a slot (not shown). A digital I/F 121 such as an IEEE1394 I/F receives encoded data from external equipment while outputting the moving image and audio data stored in the storage unit 103 or played back by the opto-magnetic disk 119 to the external equipment as encoded, or according to the MPEG2-TS format in the present example.

Hereafter, the editing processing of moving image data in the present embodiment will be described. In the editing apparatus according to the present embodiment, various video effects can be performed on the moving image data stored in the storage unit 103 by operating the operating unit 115 while allowing the user to view the image displayed on the display unit 107.

The following description concerns a case where the edit processing is performed by the apparatus of FIG. 1 on image data whose playback procedure is specified by the playback description data shown in FIG. 3A.

Figure 3:
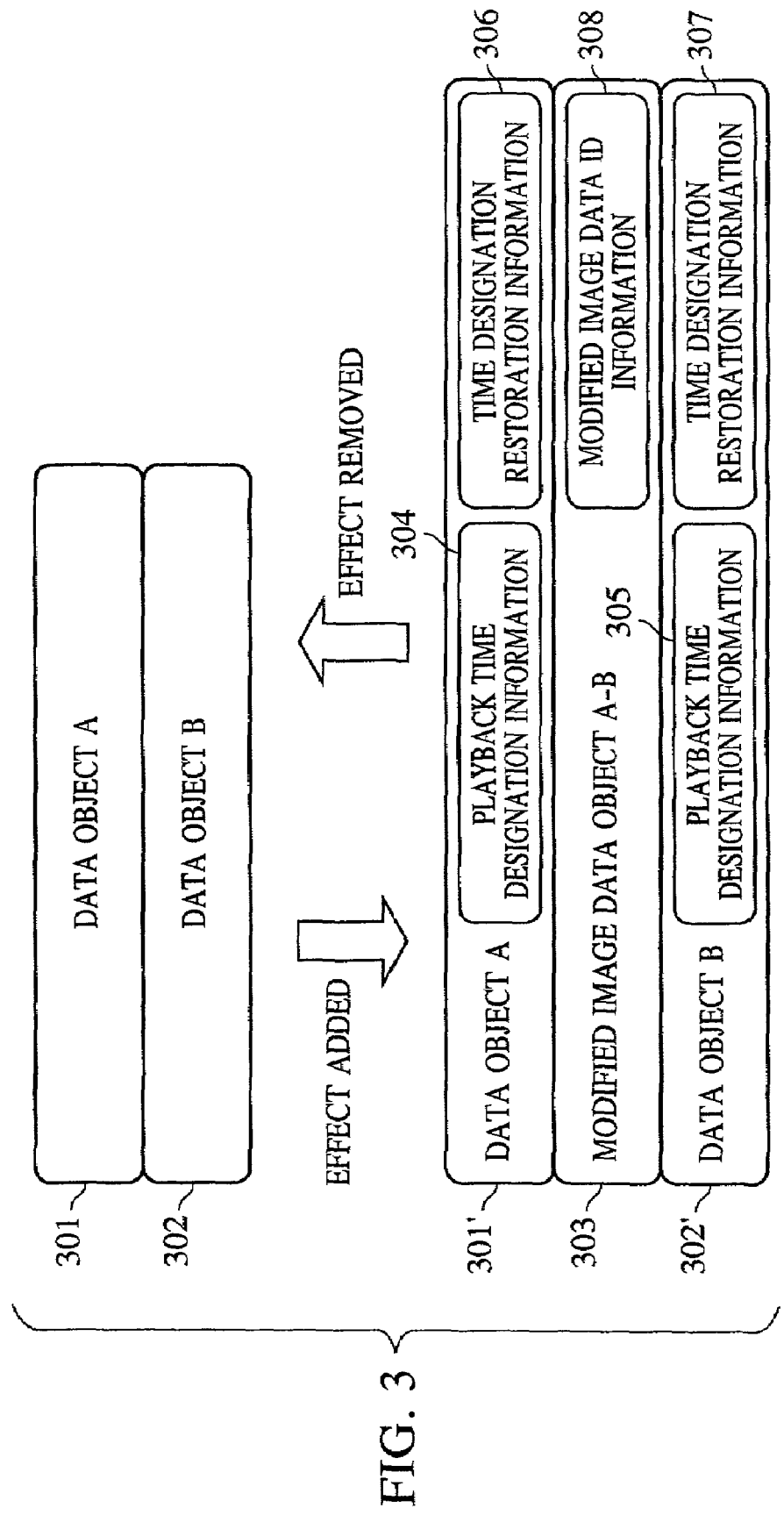
FIG. 3 shows playback description data processed in an embodiment of the present invention.

FIG. 3 shows playback description data 300 stored in the storage unit 103. The playback description data processed in the present embodiment consists of a plurality of data objects. In the playback description data shown in FIG. 3, data object A 301 and data object B 302 are data objects specifying the playback of moving image A 401 and moving image B 402, respectively, in that order, which are stored in the storage unit 103. The playback description data according to the present embodiment is based on the assumption that each data object prior to edit processing does not contain playback time designation information specifying the points of playback start and playback end of each moving image data.

Figure 4:
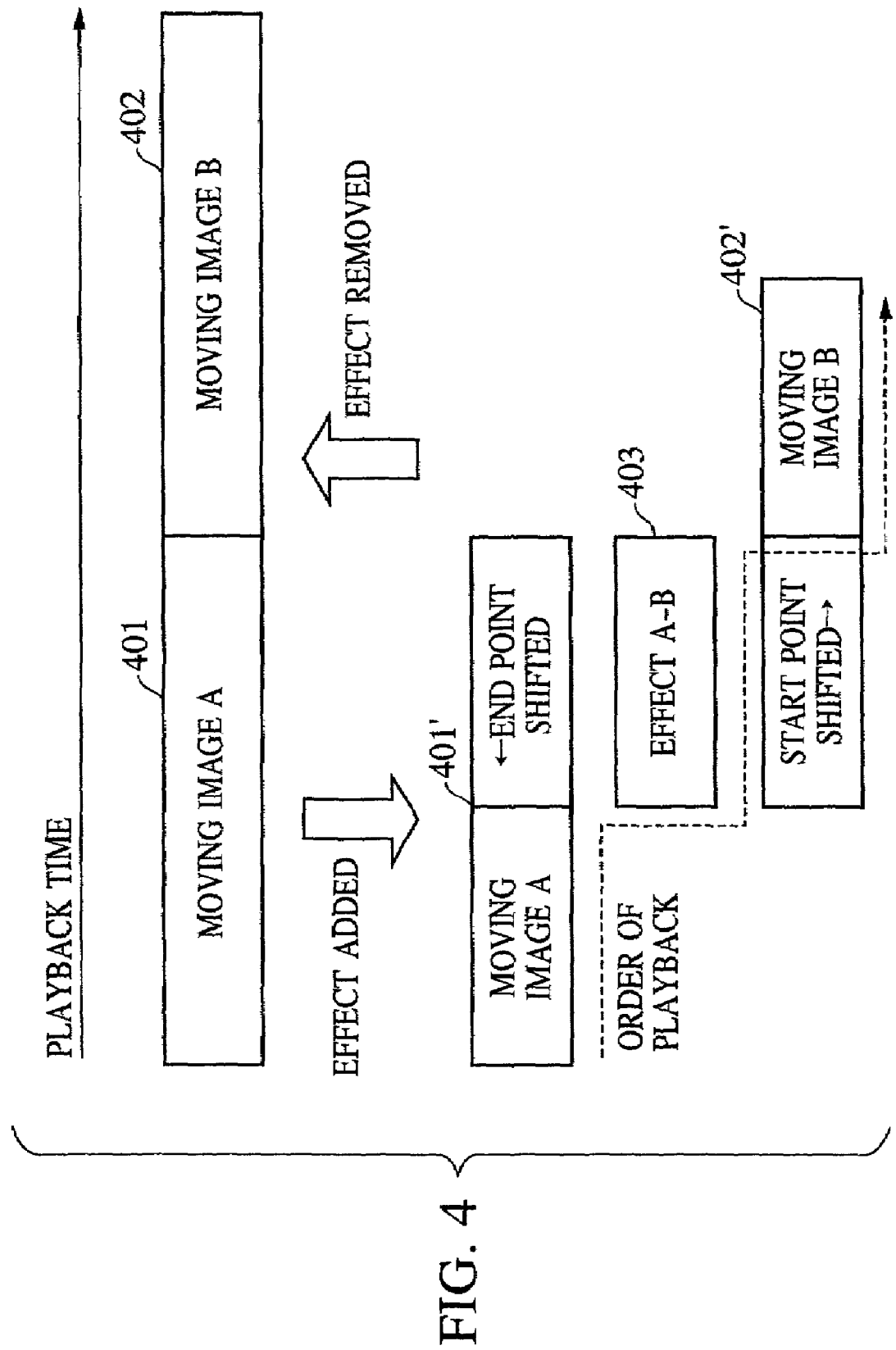
FIG. 4 illustrates the editing processing in an embodiment of the present invention.

According to the playback description data of FIG. 3, the moving image data A 401 specified by the data object A 301 is played back from beginning to end as shown in FIG. 4. This is followed by the playback of the moving image data B 402 specified by the data object B 302 from beginning to end.

Hereafter, the processing for providing a transitional effect between the moving images A 401 and B 402 will be described. In the following example, a video effect such as a wipe is provided between one second before the end of the moving image data A 401 specified by the data object A 301 and one second after the beginning of the moving image data B 402 specified by the data object B 302.

Figure 2:
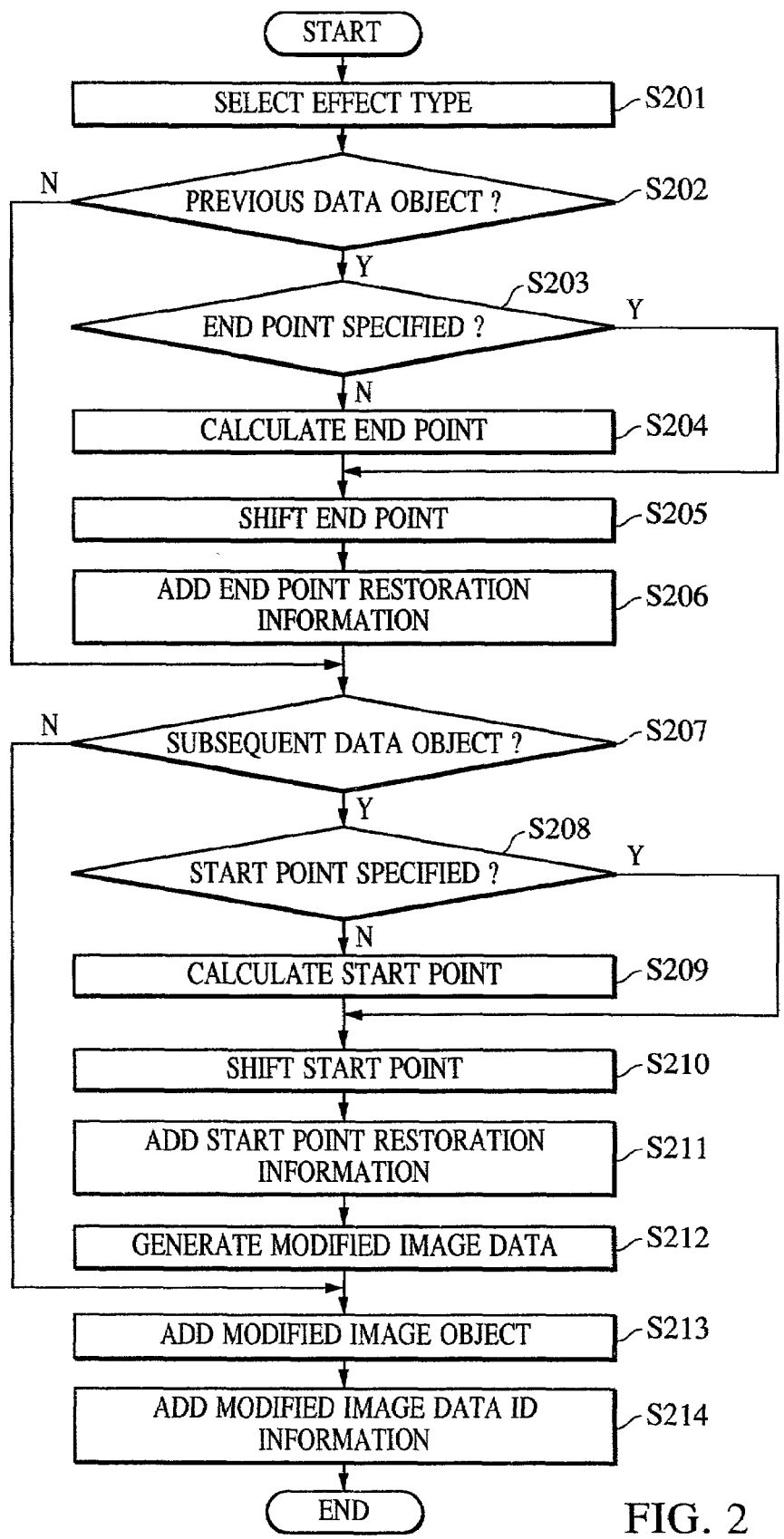
FIG. 2 is a flowchart of an editing process in an embodiment of the present invention.

FIG. 2 shows a flowchart of the processing performed by the CPU 111 during the edit processing for providing the above mentioned effect. The user instructs the desired edit processing, i.e., the provision of a wipe between the last one second of the moving image data A 401 and the initial one second of B 402, by means of the operating unit 115. In response, the CPU 111 initiates the flow of FIG. 1.

As the edit processing is started, the CPU 111 first selects the modification type according to the user's instruction as mentioned above, thereby selecting the effect to be provided to the moving images (step S201). In the present case, a wiping transitional effect is selected as the modification type. Next, the playback description data is read out of the storage unit 103 and stored in the memory 113. It is then determined whether there is a preceding original data object in the playback description data with respect to the time when the effect is applied (step S202).

The presence or absence of a preceding original data object is determined by the type of effect selected in step S201. In the present case, since the wipe effect is performed to transition from the moving image data A 401 to A 402, the data object A 301 corresponds to the preceding original data object. Thus, the determination is Y. In other words, when the selected effect is provided between two moving images or at the end of a single moving image, as in the case of fading out, the determination is Y; when the selected effect is at the beginning of a single moving image, as in the case of fading in, the determination is N.

Since the result of determination in step S202 is Y in the present example, the process goes to step S203 where a processing is performed to provide an end point restoration information to the preceding data object. In a case where the effect is a fade-in, for example, which is provided only at the beginning of the picture, the result of step S202 is N, and therefore the process skips to step S207, where the subsequent data object is determined.

In step S203, the presence or absence of an end point designation for the preceding data object is determined. As mentioned above, in the present example, there is no playback time designation information contained in any of the data objects prior to modification. Accordingly, the result of step S203 is N and the process goes to step S204 for an end point calculation processing where the original end point of the preceding data object is calculated. When the data object of the playback description data does not contain the playback time designation information, the end point is equal to the playback time of the entire moving image data specified by the preceding data object. Furthermore, it is generally the case that the existing moving image data formats are provided with time information such as the playback time information or time codes of respective frames. Accordingly, the entire playback time can be easily calculated by using that information.

In step S205, the playback end point is shifted by the duration of time of modified information data provided with the wipe processing. The content of the data object A 301 of the playback description data is modified such that during playback, the modified information data is played back instead of the moving image data A where the transitional effect is present, i.e., during the last one second of the moving image data A. Thus, data object A 301' is obtained.

FIG. 3 shows the data object A 301' to which playback time designation information 304 has been given after the end point shifting processing. FIG. 4 illustrates the shifting of the end point of the moving image data A by the aforementioned processing in the present case.

Next, in step S206, time designation restoration information 306 is generated for the restoration of the end point of the data object A 301' back to the original playback end point. The time designation restoration information 306, which is incorporated into the data object A 301', may be generated based on the information about the playback time of the modified information data which was used for the end point shifting processing in step S205.

After the processing of the preceding data object is over, it is then determined in step S207, as in step S202, whether there is a subsequent original data object with respect to the time when the effect corresponding to the selected modification type is added.

If the result of determination in step S207 is Y, as in the present case, the process goes to step S208 following which the processing for incorporating start time restoration information to the subsequent data object is initiated. If the result of step S207 is N, as in the case of fade-out which is effected only at the end of a picture, the process skips to step S212.

In step S208, it is determined whether there is a start point designation for the subsequent data object. As mentioned above, in the present case, since there is no playback time designation information contained in any of the data objects prior to modification, the result of determination is N, and the process goes to step S209. In step 209, the original start point of the subsequent data object is calculated. When the playback time designation information is not contained, the start point is equal to the start time of the moving image data specified by the preceding data object, which start point is usually "0".

In step S210, the playback start point is shifted by the duration of time of playback of the modified information data. The content of the data object B 302 of the playback description data is modified such that the modified information data is played back instead of the moving image data B when the transition effect is provided in the moving image data B, i.e., during the one second portion at the beginning of playback start time. Thus, data object B 302' is obtained.

FIG. 3 shows the data object B 302' to which playback time designation information 305 has been incorporated after the start point shifting processing. FIG. 4 illustrates in moving image 402' the shifting of the playback start point of the moving image data B by the processing in the present example.

Next, in step S211, time designation restoration information 307 is generated for restoring the start point of the data object B 302'. The time designation restoration information, which is incorporated into the data object B 302', may be generated based on the information about the playback time of the modified information data which was used for the end point shifting processing in step S205.

In step S212, modified moving image data is generated.

In the present example, new effect data A-B 403 in which a wipe effect is incorporated is generated by using the final one second picture of the moving image data A and the initial one second picture of the moving image data B as material pictures.

Hereafter, the process for generating the effect data A-B 403 to which the wipe effect is given is described.

The CPU 111 reads from the storage unit 103 the final one second moving image data of the moving image data A 401 and the initial one second moving image data of the moving image data B 402, and outputs them to the image processing unit 101. The image processing unit 101 stores the respective moving image data outputted from the storage unit 103 to its internal memory.

The moving image data played back from the storage unit 103 are encoded in the MPEG2 format, as mentioned above. The image processing unit 101 has the CODEC unit for encoding and decoding of image data, and a special effect unit for effecting wipe and dissolve processing on decoded image data. The image processing unit 101, in accordance with instructions from the CPU 111, decodes the moving image data A 401 and B 402, and provides the wipe processing to the decoded image data. The image processing unit 101 further encodes the wipe-processing provided image data again in the MPEG2 format to generate the effect data, which is stored in the internal memory. Those processes can be performed by hardware, but may also be performed by software using a microprocessor.

After the effect data is generated by the image processing unit 101, the CPU 111 reads the effect data from the image processing unit 101 and stores it in the storage unit 103. In the present example, the moving image data 401 and 402 are each stored in the storage unit 103 as an independent file. The newly generated effect data A-B 403 is also stored in the storage unit 103 as a separate file from the moving image data A 401 and B 402.

Next, in step S213, modified information data object A-B 303 is generated which is the data object specifying the effect data A-B 403 generated above. The modified information data object A-B 303 is incorporated between the data object A 301' and B 302' of the playback description data stored in the memory 113. In step S214, modified information data ID information 308 is incorporated into the modified information data object A-B 303, thereby creating final playback description data. The final playback description data is read out of the memory 113 and outputted to the storage unit 103.

When the entire processing for the edited data is thus over, the CPU 111 controls the display control unit 105 such that the display unit 107 indicates that the edit processing has been completed.

Hereafter, the case where the previously mentioned SMIL is used as the playback description data will be described.

Figure 5:
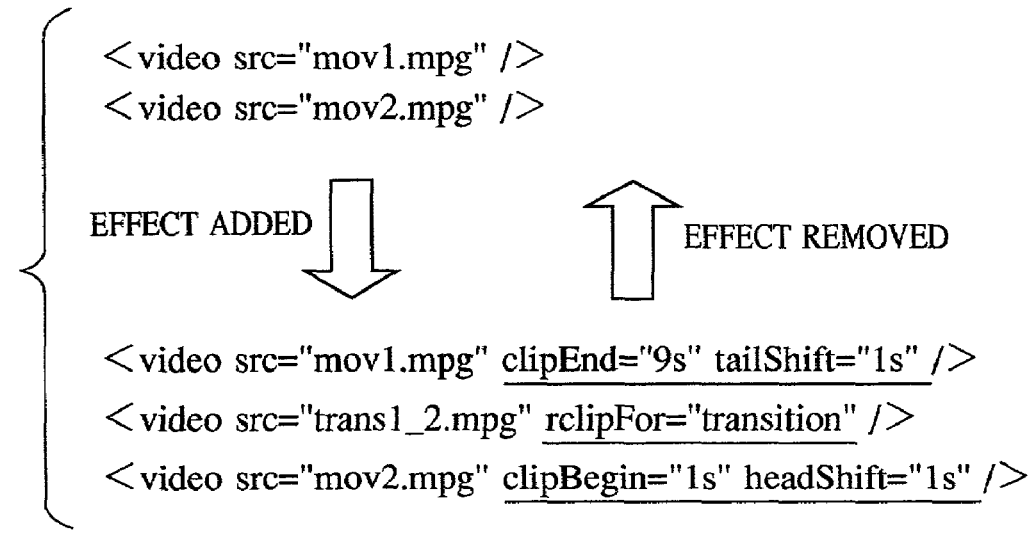
FIG. 5 shows an example of the playback description data.

FIG. 5 shows the playback description data using the SMIL. In this figure, only portions of the description relating to the processing in the present case are picked out and shown and other description elements are omitted.

In the example of FIG. 5, the preceding moving image data and subsequent moving image data each have a ten-seconds playback time, with one second provided for the incorporated effect. The original preceding and subsequent image data are designated by mov1.mpg and mov2.mpg, respectively. A one-second modified moving image data after rendering is designated by trans1_2.mpg during which the final one second picture of mov1.mpg and the initial one second picture of mov2.mpg are switched by the wipe effect. Those mov1.mpg, mov2.mpg and trans1_2.mpg are each an independent file.

The first row of the lower portion of FIG. 5 corresponds to the data object A 201' of FIG. 3. As the playback time designation information 304, clipEnd="9 s" is described according to the SMIL-standard end-point description as data indicating the 9 seconds obtained by subtracting the one-second playback time for the modified information data from the ten-seconds playback time for the mov1.mpg. Further, this data object contains the time designation restoration information 206 in which the one-second shift amount for the end point is described as tailShift="1 s" using a description element unique to the present embodiment.

The second row corresponds to the modified information data object A-B 303 of FIG. 3. The modified information data ID information 308 is described as rclipFor="transition", using a description element unique to the present example.

The third row corresponds to the data object B 302' of FIG. 3. As the playback time designation information 305 after modification, data indicating the one second of playback time of the modified information data provided at the beginning of mov2.mpg is described as clipBegin="1 s" according to the SMIL-standard start-point description. Further, this data object contains as the time designation restoration information 307 the description of headShift="1 s" indicating the one-second shift amount of the start point, using a description element unique to the present example.

Thus, in the present example, since the playback time is specified by using the existing standard description elements in the SMIL, the playback description data to which special effects have been incorporated using the present example are playback-compatible with the standard playback description data.

For example, referring to FIG. 5, the unique description elements rclipFor, tailShift and headShift in the present example are ignored in a playback processing according to the normal SMIL description elements. Accordingly, mov1.mpg is played back for 9 seconds, trans1_2.mpg is played back and then mov2.mpg is played back one second after its beginning.

As a result, as shown in FIG. 4, the playback proceeds in the order: the moving image A 301', A-B 303 and the moving image B 302'. Thus, a series of edited moving images can be played back in which a wipe effect is provided between the last one second of mov1.mpg and the initial one second of mov2.mpg. The wipe effect portion is merely based on the playback of the rendered moving image data trans1_2.mpg to which the wipe effect has been given. Accordingly, as a characterizing feature of the present example, the wipe effect can be realized only by the standard moving image playback functionality without relying on particular functionality of the playback device.

Hereafter, the processing for removing the thus provided special effect and returning back to the original state will be described.

Figure 6:
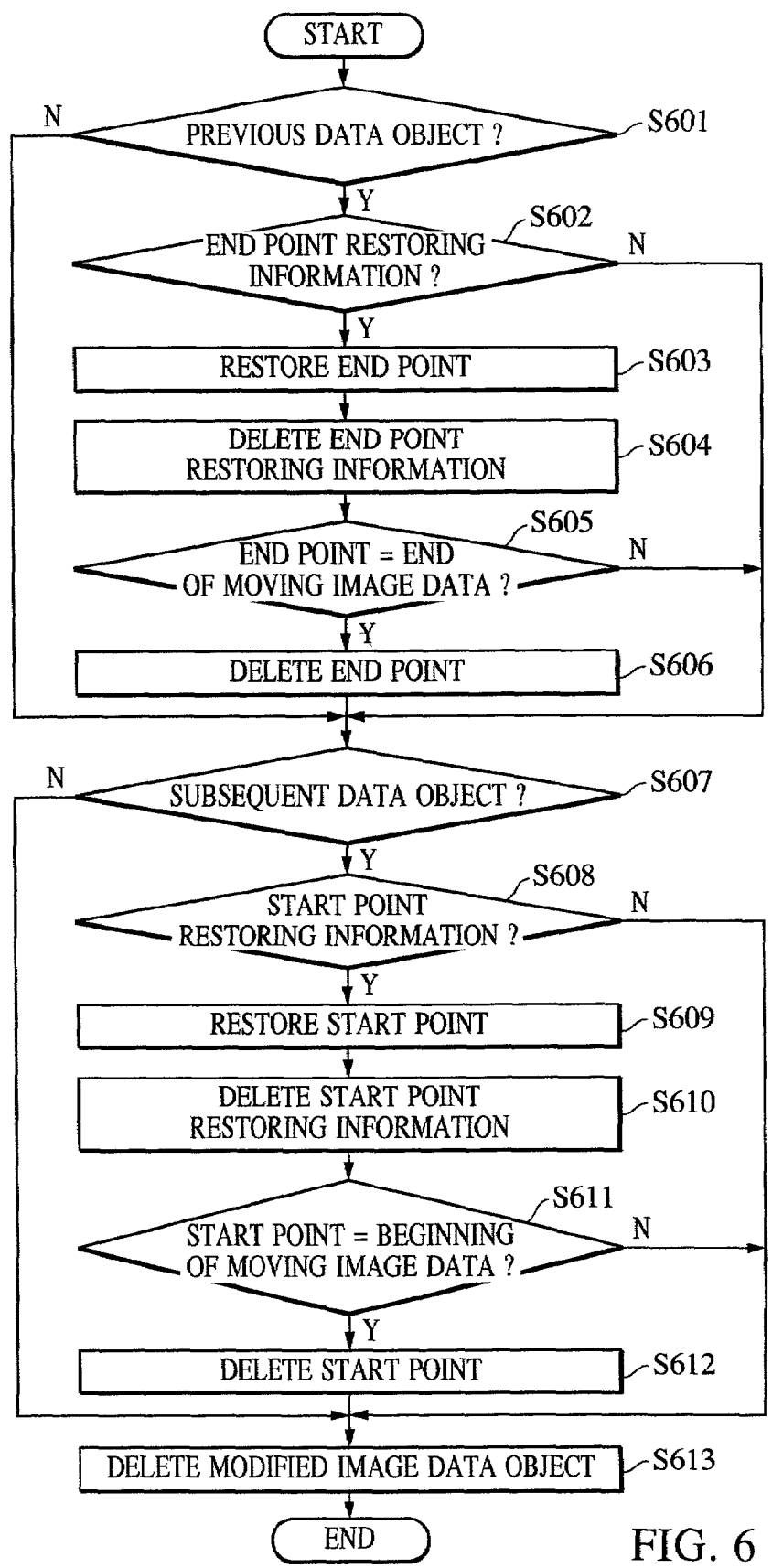
FIG. 6 is a flowchart for the explanation of the edit processing.

FIG. 6 shows a flowchart of the processing for removing the modified information data by the CPU 111. As the user instructs the removal by operating the operating unit 115 and thereby selecting the edited data to be removed, the flow of FIG. 6 is initiated.

In response to the removal instruction, the CPU 111 first reads the playback description data from the storage unit 103 and stores it in the memory 113. It is then determined if, with respect to the modified information data object A-B 303 to be removed, there is a data object specifying preceding moving image data to be played back continuously with the moving image data specified by the modified information data object along the playback time axis (step S601).

As shown in FIG. 4, in the present example, the moving image data A 401' is the moving image data which precedes the effect data A-B 403. Therefore, the data object A 301' specifying the moving image data A 401' is the preceding data object, so that the result of determination is Y, and the process goes to step S602.

If there is no preceding data object as is the case at the beginning of the playback description data, or when the preceding data object contains the modified information data ID information and can therefore be determined not to be the original data object from which the playback time specification should be restored, the process skips to step S606. In step S606, the subsequent data object is determined. The preceding data object is a modified information data object when an effect on a single moving image data is continuous as is the case when fading out to fading in.

In step S602, it is determined whether there is time designation restoration information for the preceding data object to be processed. If the preceding data object does not contain the time designation restoration information, the data object can be determined not to have been the object of end-point shifting during the addition of the modified information data object. In this case, the process skips to step S607.

In the present example, since the data object A 301' contains the time designation restoration information 306, the result of this determination is Y. Accordingly, the playback time designation information 304 is modified in accordance with the time designation restoration information 306 and the end point is restored. The specific restoration method will be described later with reference to the exemplary description shown in FIG. 5 using the SMIL. In step S604, the now unnecessary end-point restoration information 306 is removed.

At this stage, an equivalent playback to that prior to the addition of the effect may be performed according to the playback description data. However, if the playback description data is to be optimized, it may be determined in step S605 whether the restored end point corresponds to the end of the moving image data per se and, if it does, the designation of the end point may be removed in step S606. If the optimization is not necessary, steps S605 and S606 may be omitted.

In the following, the operation for restoring the playback time will be described by referring to the exemplary description of FIG. 5 using the SMIL.

Referring to the lower portion of FIG. 5, the data object in the second row is the preceding data object containing the description element rclipFor, which is the modified information data ID information in the present example. The first row is the preceding data object. The preceding data object contains the description element railShift, which is the time designation restoration information according to the present invention. Accordingly, clipEnd="9 s" can be restored back to clipEnd="10 s" by using the value "1 s" of tailShift. As mentioned above, since the playback time of mov1.mpg is ten seconds, clipEnd="10 s" can be omitted, and by doing so, it can be restored back to the description in the first row of the upper portion of FIG. 5.

Thereafter, a similar processing for restoring the playback time specification is performed on the subsequent data object.

In step S607, it is determined whether, with respect to the modified information data object A-B 403 to be removed, there is a data object specifying subsequent moving image data which is played back continuously, on the playback time axis, following the moving image data specified by the modified information data object.

As shown in FIG. 4, in the present example, the moving image data B 402 is the moving image data which follows the effect data A-B 403. As the data object specifying this moving image data corresponds to the subsequent data object, the result of determination is Y, and the process goes to step S608.

When there is no subsequent data object as is the case at the end of the playback description data, or when the subsequent data object contains the modified information data ID information and can therefore be determined not to be the original data object for which the playback time specification should be restored, the process skips to step S613. The subsequent data object is a modified information data object when an effect is continuously provided on a single moving image data extending from fade-in to fade-out, for example.

In step S609, it is determined whether there is the time designation restoration information for the subsequent data object to be processed as a result of the aforementioned determination. If the subsequent data object does not contain the time designation restoration information, it can be determined that that data object was not the object of start-point shift when the modified information data object was added. In this case, therefore, the process skips to step S613.

In the present example, since the data object B 302' contains the time designation restoration information 307, the result of this determination is Y. Then, the playback time designation information 305 is modified according to the time designation restoration information 307 to restore the start point. The specific restoration method will be described later with reference to the example using the SMIL shown in FIG. 5. In step S610, the now unnecessary start-point restoration information is removed.

At this stage, an equivalent playback to that prior to the addition of the effect can be performed according to the playback description data. However, if the playback description data is to be optimized, it may be determined in step S611 whether the start point restored in step S611 is the start ("0 s") of the moving image data per se and, if it is, the information specifying the start point may be removed in step S612. If the optimization is not necessary, steps S611 and S612 may be omitted.

Hereafter, the playback time designation restoration operation will be described by referring to the exemplary description shown in FIG. 5 using the SMIL.

Referring to the lower portion of FIG. 5, the second row is the modified information data object containing a description element rclipFor which is the modified information data ID information according to the present embodiment. The third row is the subsequent data object.

Since the subsequent data object contains the description element headShift, which is the time designation restoration information according to the present embodiment, clipBegin="1 s" can be restored back to clipBegin="0 s" by using the value "1" of headShift. As mentioned above, as the start of mov1.mpg is zero second, clipEnd="0 s" can be omitted, and by removing it, the description on the second row of the upper portion of FIG. 5 can be restored.

Finally, in step S613, the modified information data object A-B 303 with the modified information data ID information is removed. In the lower portion of FIG. 5, the description data on the second row is removed, whereby the state prior to the modification can be restored. The playback description data thus modified back to the state prior to the modification is read from the memory 113 and stored in the storage unit 103. While the effect data A-B 403 is left stored in the storage unit 103, it may alternatively be removed from the storage unit 103 in step S613, thereby to utilize the storage area more effectively.

Thus, in accordance with the present embodiment, image data is newly generated for a designated portion of moving image data where a special effect processing has been performed. And the playback time designation information within the playback description data is modified such that the newly created modified image data is played back instead of the original moving image data. Accordingly, even in cases where the playback environment is unable to execute highly sophisticated and complicated special effect processing, edited images with desired special effects can be obtained in accordance with the present invention.

Since the playback description data is provided with the time designation restoration information, the playback time of the original moving image data can be accurately restored even when the modified information data is removed.

Further, as the modified information data is encoded while it has already been provided with special effect processing, an edited image with the same desired special effect can be obtained in an external device even when the moving image data A, B and the modified information data are played back from the storage unit 103 according to the playback description data and outputted, as encoded, via the DIF 121 to the external device.

Figure 7:
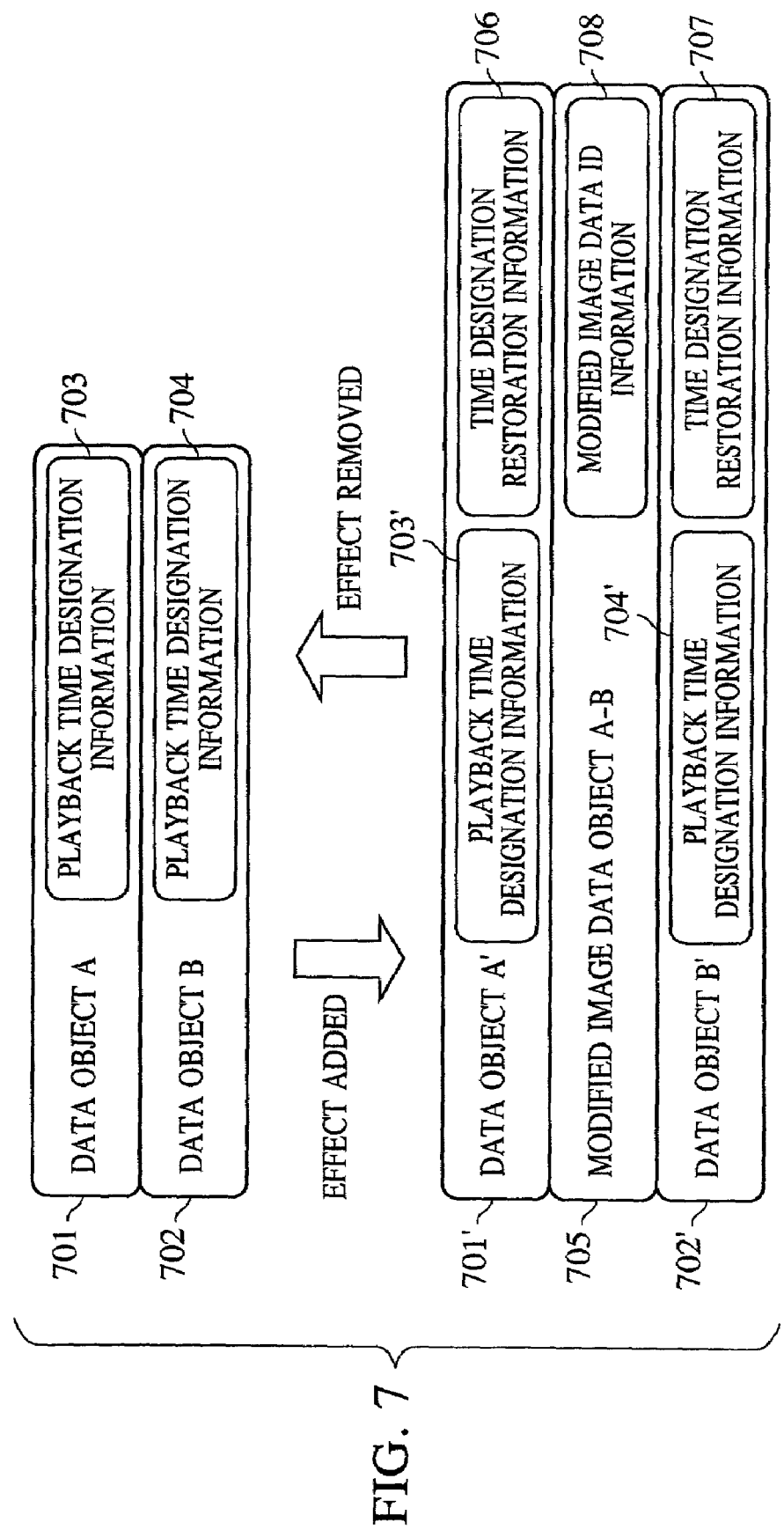
FIG. 7 shows another example of the playback description data.

Hereafter, a second embodiment of the present invention will be described, in which a processing is performed to provide a transitional effect between moving image data A and B, which are played back according to playback description data provided with the playback time designation information as shown in FIG. 7.

FIG. 7 shows the playback description data used in the present embodiment.

Figure 8:
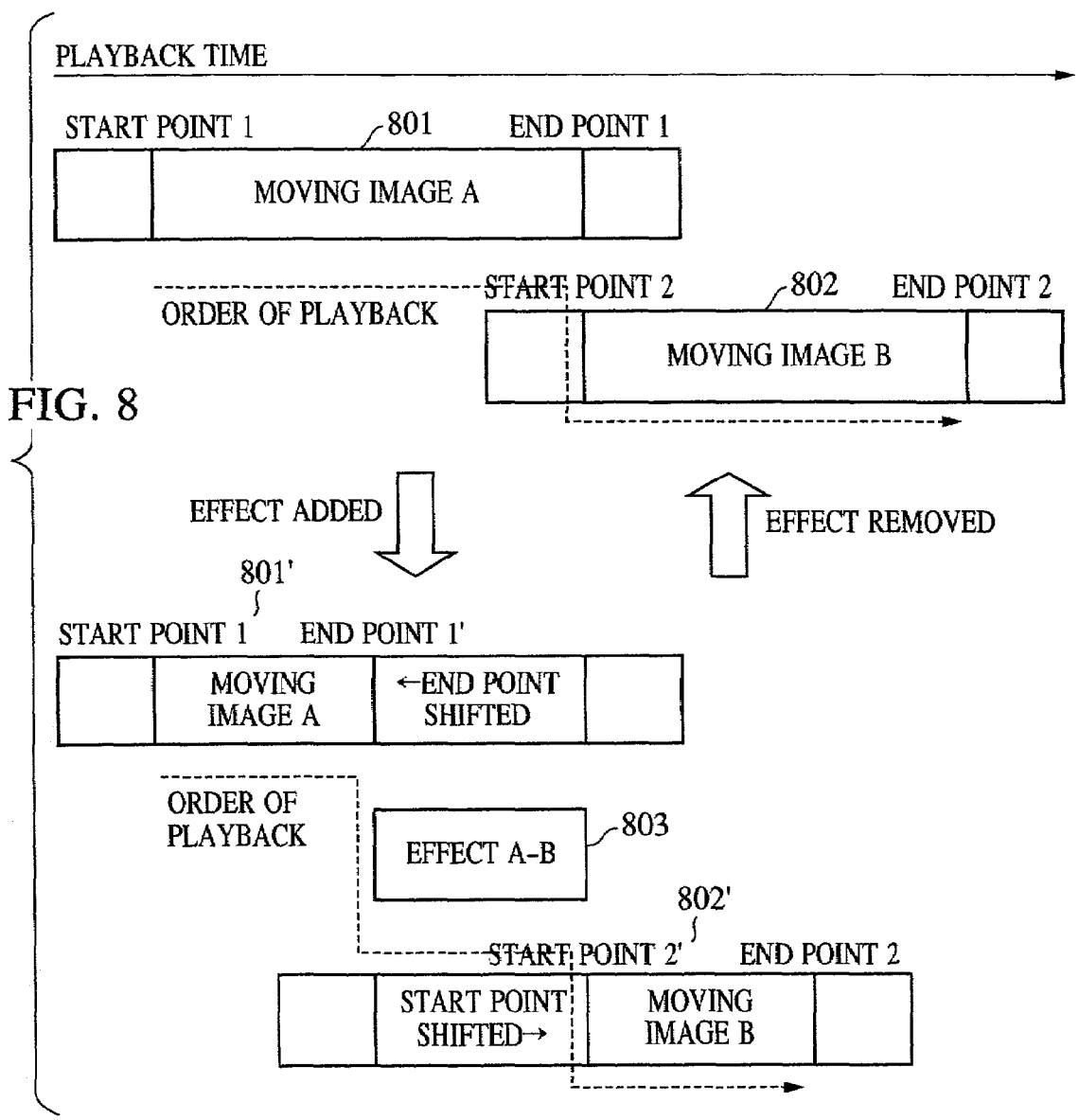
FIG. 8 illustrates another edit processing in an embodiment of the present invention.

In FIG. 7, data objects A 701 and B 702 in playback description data 700 are data objects that designate moving images A 801 and B 802, respectively, of FIG. 8. In the present embodiment, the respective data objects prior to modification contain playback time designation information designating the playback start point and playback end point of the respective moving image data, as opposed to the first embodiment described above.

In this case, the moving image A 801 designated by the data object A 701 is played back from start point 1 to end point 1 according to the description of playback time designation information 703. This is followed by the playback of the moving image B 802 designated by the data object B 702 from start point 2 to end point 2 according to the description of playback time designation information 704.

Figure 9:
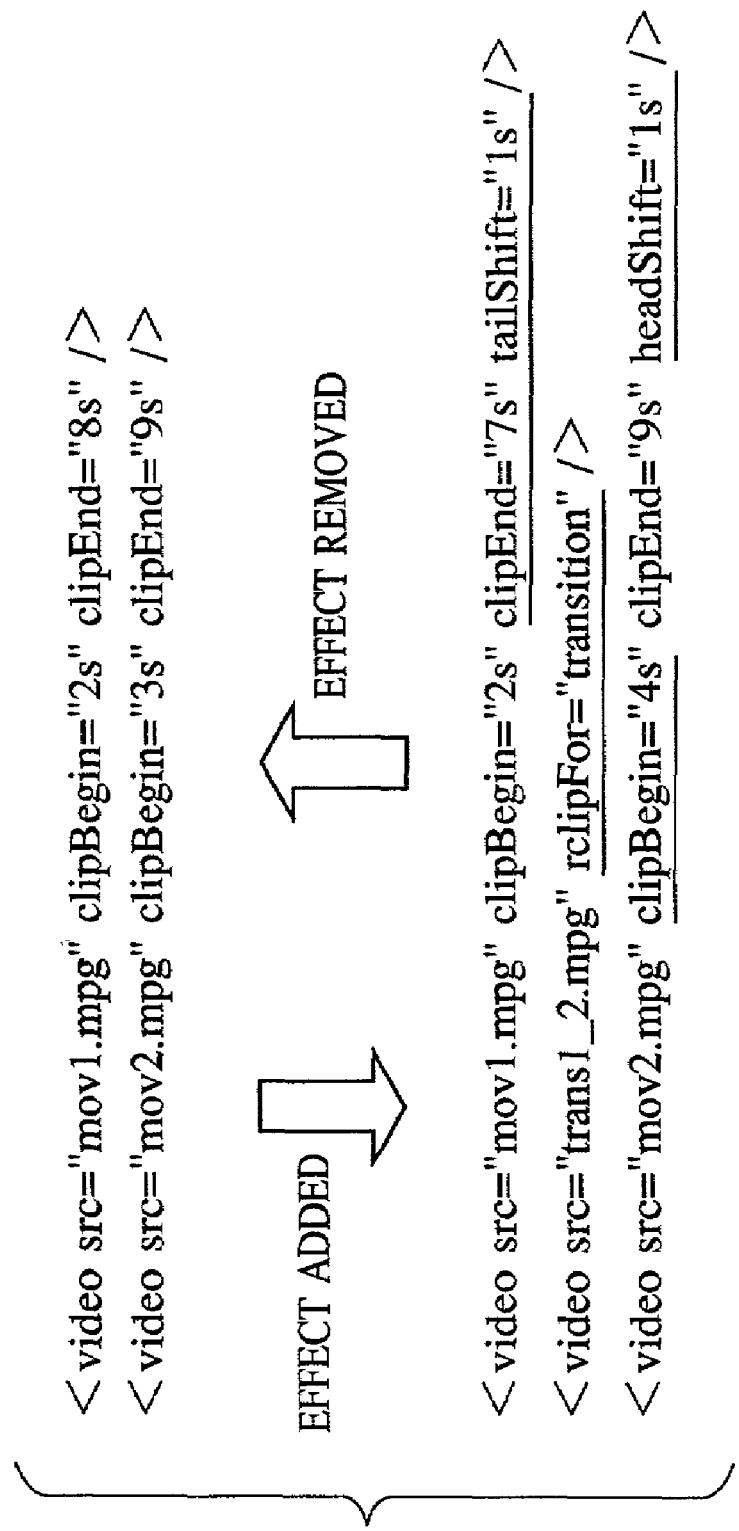
FIG. 9 shows another example of the playback description data.

FIG. 9 shows playback description data containing playback time designation information described by the SMIL. FIG. 9 shows only those descriptions relevant to the present embodiment and other description elements are omitted.

In this example, playback starts two seconds after (start point 1) the start of mov1.mpg up to eight seconds later (end point 1). Thereafter, playback starts three seconds after (start point 2) the start of mov2.mpg up to nine seconds later (end point 2). Those playback time designation information are described using the SMIL standard description elements.

Hereafter, the procedure for inserting the transitional effect between the moving images A 801 and B 802 will be described. The following processing can be realized by the CPU 111 of FIG. 1 executing the flow of FIG. 2.

The following description of the present embodiment concerns the case where the moving image A 801 designated by the data object A 701 transitions from one second prior to its designated end point 1 to one second later than the designated start point 2 of the moving image B 802 designated by the data object B 702, the transition involving a wipe effect.

As the edit processing is started, the CPU 111 first selects the modification type in response to the user's instruction as mentioned above, thus selecting the type of effect to be provided to the moving images (step S201). In the present embodiment, a wipe is selected as the transitional effect. Next, the playback description data is read out of the storage unit 103 and stored in the memory 113. Then, it is determined whether there is a preceding original data object in the playback description data with respect to the time when the effect is to be added (step S202).

The presence or absence is dependent on the type of effect selected in step 201. As the wipe effect selected in the present embodiment is a transitional effect extending from the moving image data A 801 to B 802, the data object A 701 corresponds to the preceding original data object. Thus, the result of the determination in step S202 is Y.

In step S203, it is determined whether there is an end point designation for the preceding data object. As mentioned above, in the present embodiment, since the respective data objects prior to modification contain the playback time designation information, the result of this determination is Y, and the process goes to step S205.

In step S205, the end point of the preceding data object is shifted by the playback time of the modified information data. The content of the data object A 701 of the playback description data is modified such that, during playback, modified information data is played back where the transitional effect is to prevail instead of the moving image data A 801. This produces data object A 701'.

Now referring to FIG. 7, playback time designation information 703' indicates that the above end-point shifting processing has been performed on the data object A. FIG. 8 shows the original end point 1 having been shifted to end point 1'. Referring to the lower portion of FIG. 9, the first row is an exemplary description of the playback description data by the SMIL, where the original end point designation clipEnd="8 s" by the first row of the upper portion of FIG. 9 has been changed to clipEnd="7 s" by the end point shifting processing.

Next, in step S206, time designation restoration information 206 is generated, which is used for restoring the end point of the data object A 701' back to the original playback end point. The time designation restoration information 206 is then incorporated into the data object A 701'.

The first line tailShift="1 s" in the lower portion of FIG. 9 is the description element indicating the time designation restoration information, indicating that the end point has been shifted by one second from clipEnd="8 s" to clipEnd="7 s".

Thus, as the processing on the preceding data object is over, it is then determined in step S207 whether there is a subsequent original data object with respect to the time when the effect depending on the modification type is to be applied, as in step S202. The presence or absence is dependent on the type of effect selected in step S201. Since in the present embodiment, the wipe effect selected is a transitional effect extending from the moving image A 801 to B 802, the data object B 701 corresponds to the subsequent original data object. Hence, the result of this determination is Y.

It is then determined in step S208 whether or not there is a start point designation for the subsequent data object. As mentioned above, since, in the present embodiment, the individual data objects prior to modification contain the playback time designation information, the result of this determination is Y, and the process goes to step S210.

In step S210, the playback start point of the subsequent data object is shifted by the playback time of the modified information data. The content of the data object B of the playback description data is modified such that the modified information data is played back in the portion where the transitional effect is to be applied, instead of the moving image data B during playback. This creates data object B 702'.

The playback time designation information 704' of FIG. 7 shows that the start-point shifting processing has been performed on the data object B. FIG. 8 shows the original end point 2 of the moving image B 802 having been changed to end point 2'. In the description on the third row of the lower portion of FIG. 9, the original start point designation clipBegin="3 s" on the second row of FIG. 9 has been changed to clipBegin="4 s".

In step S211, time designation restoration information 707 for the restoration of the start point of the data object B 702' is generated and incorporated into the data object B 702'. This time designation restoration information can be generated based on the information about the playback time of the modified information data which was used for the end-point shifting processing in step S205.

The description element headShift="1 s" on the third row of the lower portion of FIG. 9 describes the time designation restoration information, indicating that the start point of clipBegin="3 s" has been shifted by one second to clipBegin="4 s".

In step S212, moving image clip effect data A-B 803 to which the wipe effect has been provided is newly created by using as material pictures a portion of the picture of the moving image data A 801 between one second prior to the designated end point to the end point, and a portion of the picture of the moving image data B 802 between the designated start point to one second after the start point. The processing for generating this modified information data is similar to the one in the first embodiment.

Next, in step S213, modified information data object A-B 705 is generated, which is a data object designating the effect data A-B 803 obtained above. The modified information data object A-B 705 is added between the data object A 701' and B 702' of the playback description data stored in the memory 113. In step S214, the modified information data object A-B 705 is provided with modified information data ID information 708, thereby creating final playback description data, which is read from the memory 113 and outputted to the storage unit 103.

The second row of the lower portion of FIG. 9 corresponds to the modified information data object A-B 705, in which the modified information data ID information 708 is described as rclipFor="transition", using a description element.

Thus, by modifying the content of the playback description data while generating the modified information data, the moving image A 801', the effect A-B 803 and the moving image B 802' are played back in that order, as shown in the lower portion of FIG. 8. Accordingly, a series of edited moving images can be played back, in which a wipe effect is provided in a portion extending one second prior to the original playback end point 1 of mov1.mpg to one second after the original playback start point 2 of mov2.mpg. This wipe effect portion is merely based on the playback of the rendered moving image data trans1_2.mpg to which the wipe effect has been added. Therefore, the wipe effect can be realized by a standard moving image playback functionality without having to rely on a particular functionality of the playback machine, which is characteristic of the present embodiment.

Furthermore, the thus generated modified information data object can be removed by the CPU 111 following the same procedure according to the flow of FIG. 6 as in the previous embodiment. This will be hereafter described by referring to the exemplary description of FIG. 9 using the SMIL.

In FIG. 9, the data object in the second row of the lower portion is the modified information data object containing the description element rclipFor, which is the modified information data ID information. The first row indicates the preceding data object. As the preceding data object contains the description element tailShift, which is the time designation restoration information, clipEnd="7 s" can be restored back to clipEnd="8 s" by using the value "1 s" of tailShift. As mentioned above, since the playback time of mov1.mpg is ten seconds, clipEnd="8 s" cannot be omitted and is instead left as it is, in order to end the playback of mov1.mpg at the original playback point. The tailShift description element is removed after the restoration of the end time.

Similarly, the third row is the subsequent data object. As it contains the description element headShift which is the time designation restoration information, clipBegin="4 s" can be restored back to clipBegin="3" by using the value "1 s" of headShift. As mentioned above, since the head of mov1.mpg is zero second, clipEnd="3 s" cannot be omitted and is left as it is, in order to playback mov2.mpg from the original playback start point. The description element headShift is removed after the restoration of the start time. Finally, the description data of the modified information data object on the second row is removed and the original state shown in the upper portion of FIG. 9 before modification can be restored.

Thus, in the present embodiment, image data is newly generated for a designated portion of the moving image data where a special effect processing is provided. At the same time, even when the playback start point and end point of the original moving image data are already specified by the playback description data, the playback time designation information within the playback description data is modified according to the content of the original playback description data such that the newly generated modified image data is played back instead of the original moving image data. Accordingly, edited images with desired special effects can be obtained even in a playback environment which is unable to execute a highly sophisticated and complex special effect processing.

Furthermore, as the time designation restoration information is added to the playback description data, the playback time of the original moving image data can be accurately restored after the modified information data is removed.

In the edit processing where the present invention is applied, when there is no limit to the units of designation for the playback time in the data object of the playback description data, the length of the modified information data and the shifting of the start and end points necessitated by the addition of the modified information data may be determined in accordance with the content of the special effect processing as specified by the user.

For example, if the special effect is a wipe of one second, one-second modified information data may be generated, as described in the previous embodiments, and the start and end points of the original data object may be each shifted by one second, followed by the addition of the data object of the modified information data.

On the other hand, it may be that there is a limit to the designation units for the playback time in the data object, for reasons of the encoding format of the moving image data stored, or the logical or physical recording format in the storage unit 103 or the magnetic disc 119.

In those cases, too, the present invention can be utilized by generating modified information data by extracting the moving image data in such a manner as to coincide with the boundary of the data processing units including the desired effect portion, and shifting the start and end points in accordance with the modified information data.

Hereafter, the processing for generating the modified information data and shifting the playback start and end points in the case where the designation units for the playback time is limited will be described.

Figure 10:
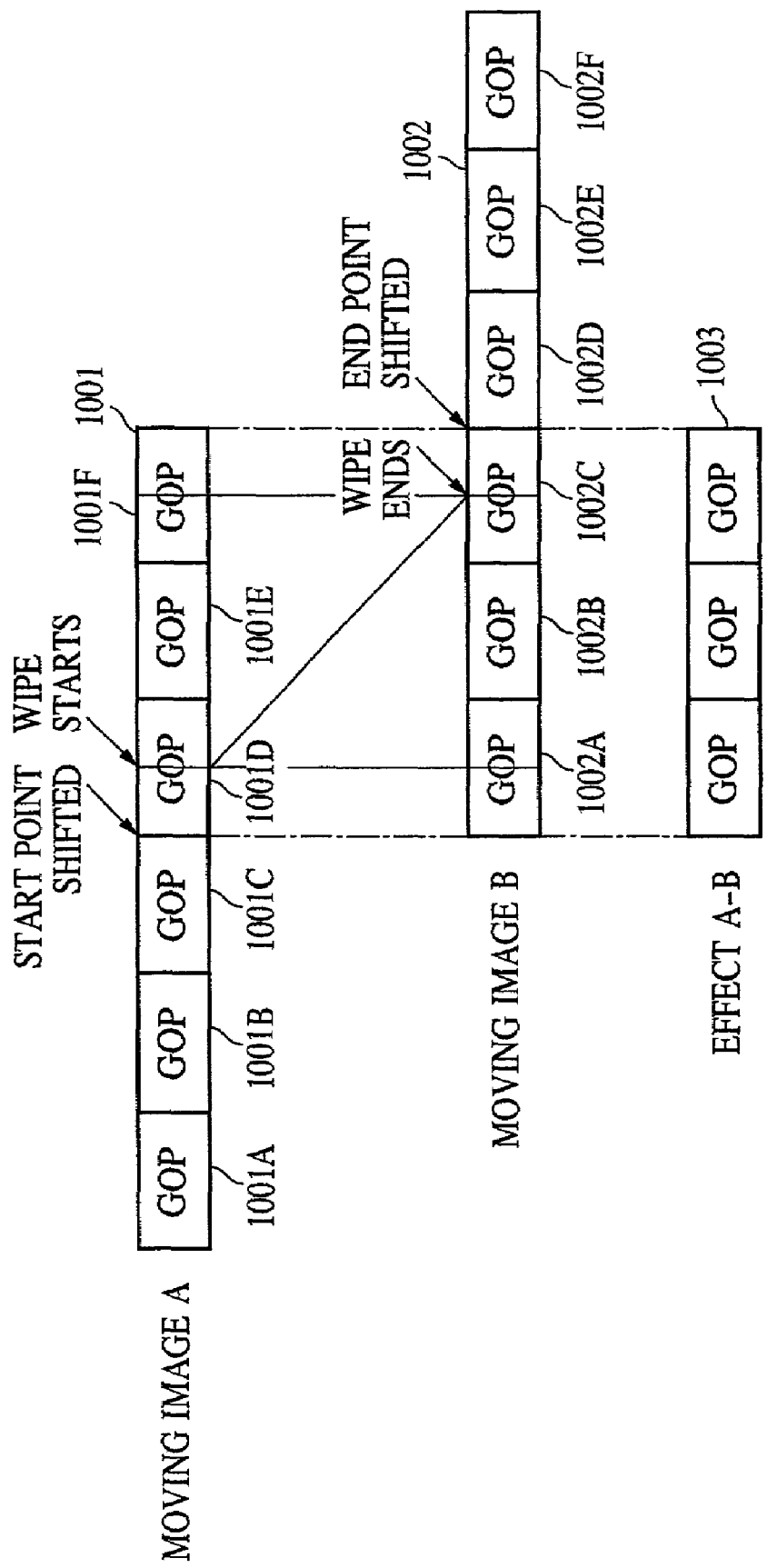
FIG. 10 illustrates a processing for shifting playback time.

FIG. 10 illustrates the creating of the modified information data, in which the moving image data is extracted in such a manner as to coincide to the encoding units of the moving image data.

In the present example, the moving image data is encoded by the MPEG 2 format, and the GOP (group of pictures) in the MPEG encoding is assumed as the encoding unit. In MPEG, a single GOP is usually formed by fifteen frames of moving image data. Also, in MPEG, playback is possible only on a minimum one GOP unit basis, as the intra-frame coding and inter-frame coding are selectively used for encoding.

Accordingly, as shown in FIG. 10, if the start of a wipe processing is designated somewhere within a GOP of moving image data A 1001 and the end of the wipe processing is designated somewhere within a GOP of moving image data B 1002, the moving image data A 1001 and B 1002 are extracted in units of GOP containing the start and end portions of the wipe processing. In FIG. 10, a GOP 1001D containing the wipe start point, a GOP 1001F containing the wipe end point, and a GOP 1001E in between are extracted from the moving image data A 1001. Likewise, a GOP 1002A with the wipe start point, a GOP 1002C with the wipe end point, and a GOP 1002B in between are extracted from the moving image data B 1002. Based on the image data of the individual GOPs thus extracted, effect data A-B 1003 designated by the modified information data object is created in such a manner as to coincide with the boundaries between the GOPs containing the wipe effect time.

At the same time, playback time designation information and time designation restoration information are incorporated into the data object of the playback description data such that the playback end point of the moving image data A 1001 and the playback start point of the moving image data B 1002 are along the boundaries between the GOPs.

Thus, by generating the modified information data by cutting out the image data in a manner coinciding with the encoding units of the image data, moving image data to which a desired edit processing has been effected can be obtained even when the moving image data can be played back only in units of encoding.

Figure 11:
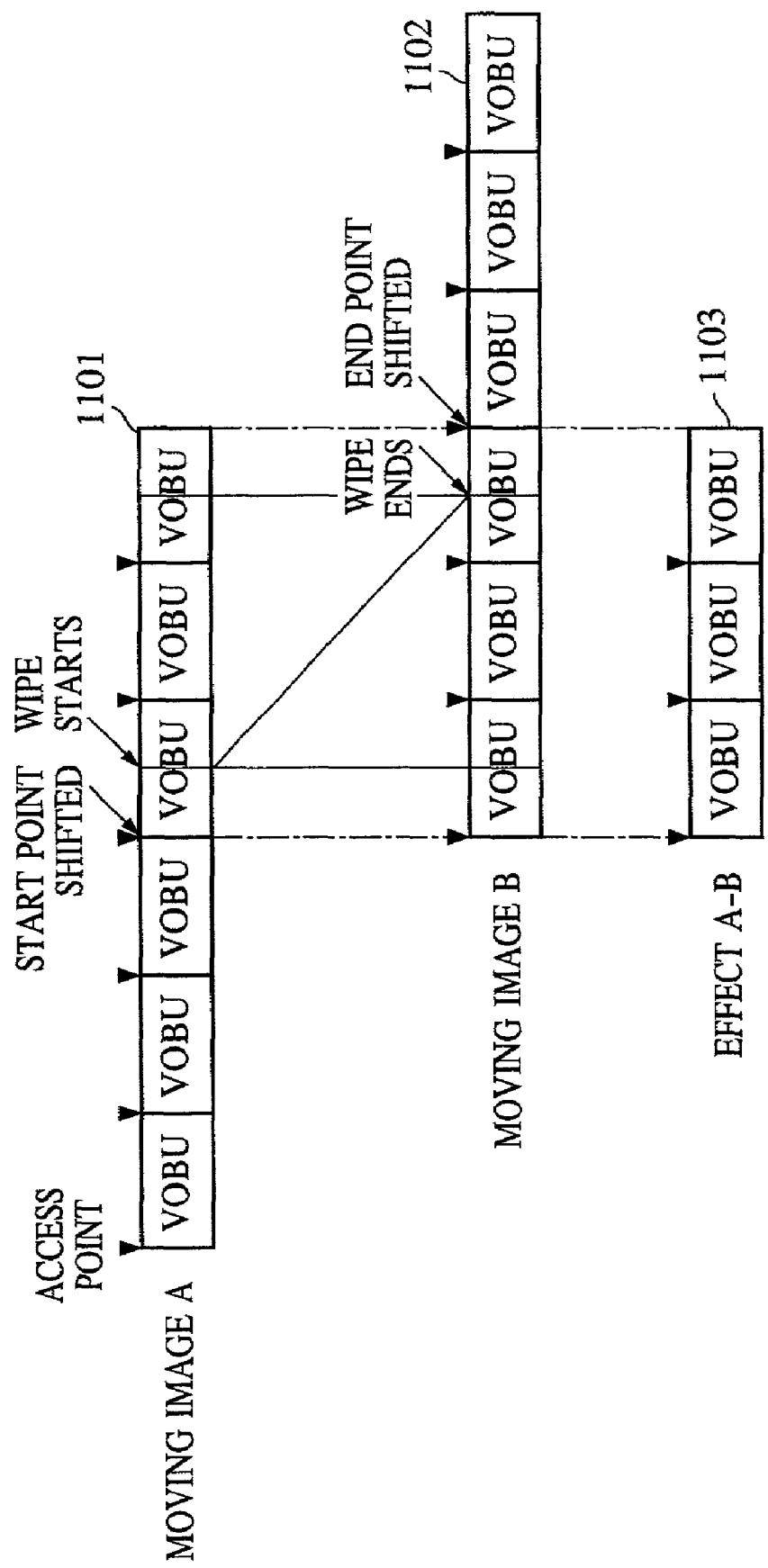
FIG. 11 illustrates another example of the processing for shifting playback time.

FIG. 11 illustrates the extraction of the moving image data in a manner coinciding with the access units on the recording medium for the generation of the modified information data.

For example, in a DVD video player, access occurs on a VOBU (video object unit) basis.

If, for example, the start of a wipe processing is designated somewhere in the data of a single VOBU in moving image data A 1101 and the end of the wipe processing is designated somewhere in the data of a single VOBU in moving image data B 1102, the moving image data A 1001 and B 1002 are extracted in units of VOBUs containing the start and end portions of the wipe processing. And effect data A-B 1103 designated by the modified information data object is generated in a manner coinciding with the boundary of the VOBUs containing the wipe effect time.

Correspondingly, playback time designation information and time designation restoration information are added to the data object of the playback description data such that the playback end point of the moving image data A 1101 and the playback start point of the moving image data B 1102 are along the boundary of the VOBUs.

Thus, by generating the modified information data by cutting out the image data in a manner coinciding with the access units of the image data in the medium, moving image data to which a desired edit processing has been provided can be obtained even when the access units of the image data are limited.

Figure 12:
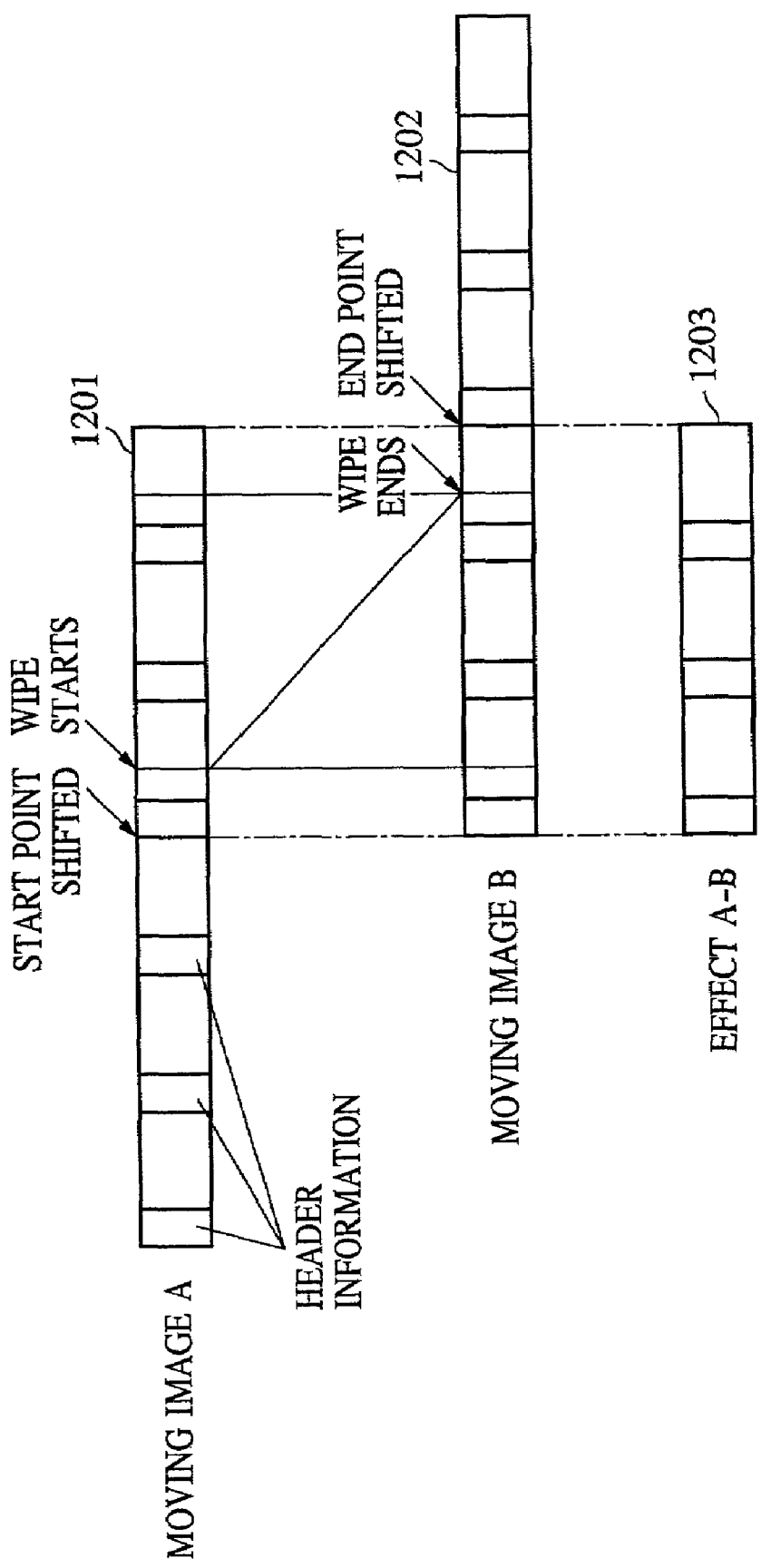
FIG. 12 illustrates yet another example of the processing for shifting playback time.
Figure 13:
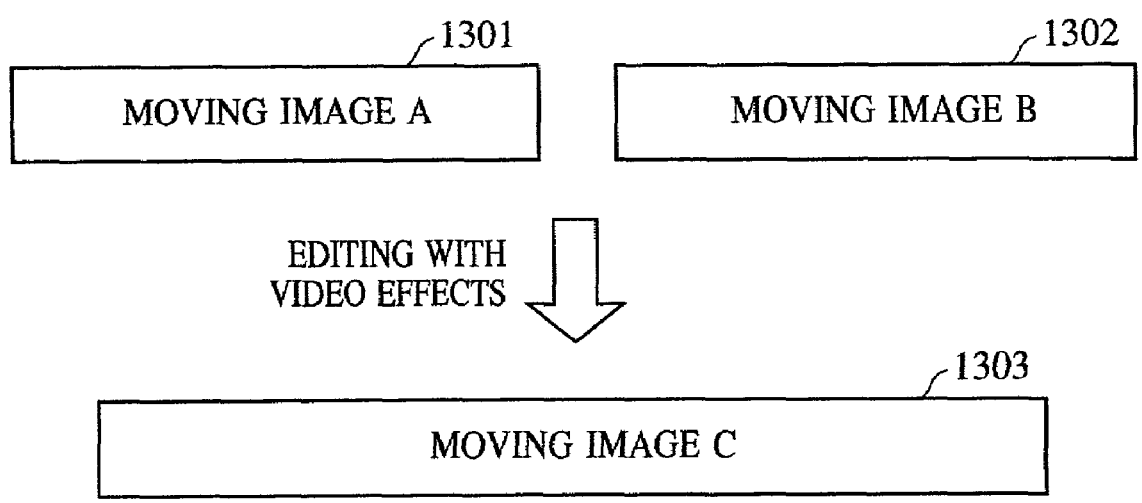
FIG. 13 illustrates a conventional edit processing.

FIG. 12 illustrates the extraction of the moving image data in a manner coinciding with the units of blocks containing header information, for the generation of the modified information data.

Depending on the format of the moving image data, header information containing necessary information for playback is inserted at predetermined intervals. When playing back such moving image data, the image data cannot be decoded until the header information is obtained.

Accordingly, if, for example, the start of a wipe processing is designated somewhere in the data of a single block in moving image data A 1201 containing the header information and the end of the wipe processing is designated somewhere in the data of a single VOBU in moving image data B 1202 containing the header information, the moving image data A 1201 and B 1202 are extracted in units of blocks containing the start and end portions of the wipe processing. And effect data A-B 1203 designated by the modified information data object is generated in a manner coinciding with the boundary of the blocks. As a result, the blocks to which the header information is added are included in the newly generated modified information data.

Correspondingly, playback time designation information and time designation restoration information are added to the data object of the playback description data such that the playback end point of the moving image data A 1201 and the playback start point of the moving image data B 1202 are along the boundary of the blocks.

Thus, by generating the modified information data by cutting out the image data in a manner coinciding with the boundary of the blocks to which the header information is attached, moving image data with a desired edit processing can be obtained without stopping the decoding of the image data until the header information is obtained, even when the playback image moves from the original moving image data to the modified information data.

Hereafter, a third embodiment of the present invention will be described.

Referring to FIG. 10, when generating the modified information data on the MPEG-encoded image data according to the playback description data as mentioned above, it is necessary that the transition from the modified information data to the material data occurs at the boundary of the GOPs separating the individual units of inter-frame coding by MPEG, in order to ensure smooth transition during playback.

Figure 14A:
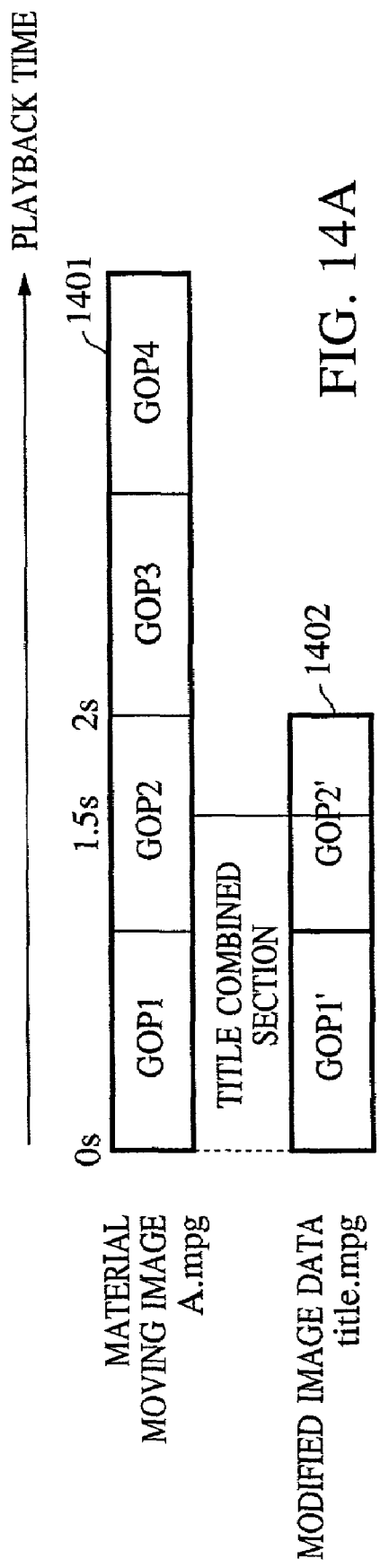
FIGS. 14A and 14B illustrate a playback timing by the playback description data.

For example, as shown in FIG. 14, when generating modified information data 1402 for a combined title lasting 1.5 seconds from the start of material moving image data 1402 which is encoded by MPEG2, the modified information data extends over a duration of two seconds from GOP1' to GOP2', instead of the 1.5-second section where the title is actually combined, so as to achieve alignment with the boundary of the GOPs.

Figure 14B:
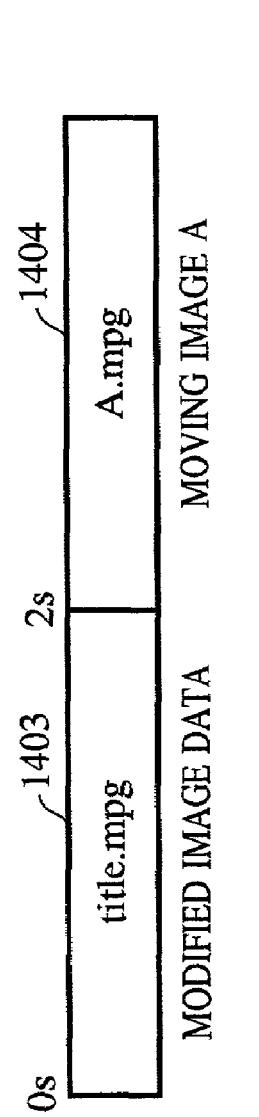

If time lane display, which is conventionally used in moving image editing equipment, is employed based on the playback description data during editing, there will be merely displayed such data as moving image data 1404 as shown in FIG. 14B, which is continuous with modified information data 1403, despite the actual title combined section extending from zero to 1.5 seconds. This is due to the fact that the information about the actual title combined section is not recorded in the modified information data.

As a result, the user may be inconvenienced during editing, unable to know in which section of the modified information data 1403 the modification processing is provided.

The present embodiment, which will be described below, is designed to enable the user to know exactly which portion of the modified information data incorporates the modification processing, even when the modified information data has been generated on the basis of the moving image data processing units. The embodiment, as were the previous embodiments, is based on the application of the present invention to the editing apparatus of FIG. 1.

First, the structure of the data processed in the present embodiment will be described.

Figure 15:
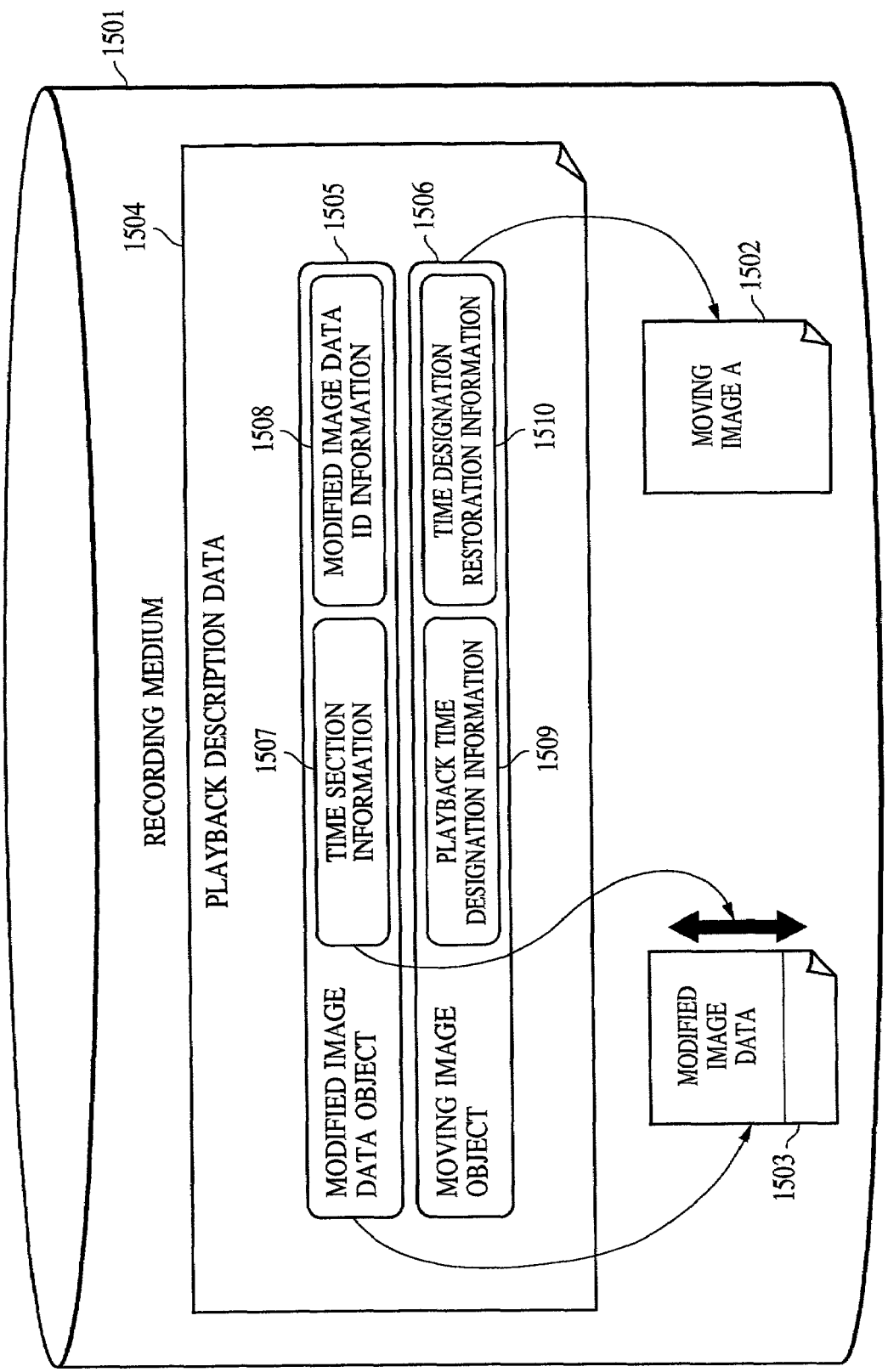
FIG. 15 illustrates a state of data processed in an embodiment of the present invention.

FIG. 15 shows the structure of the data processed in the present embodiment.

Figure 16A:
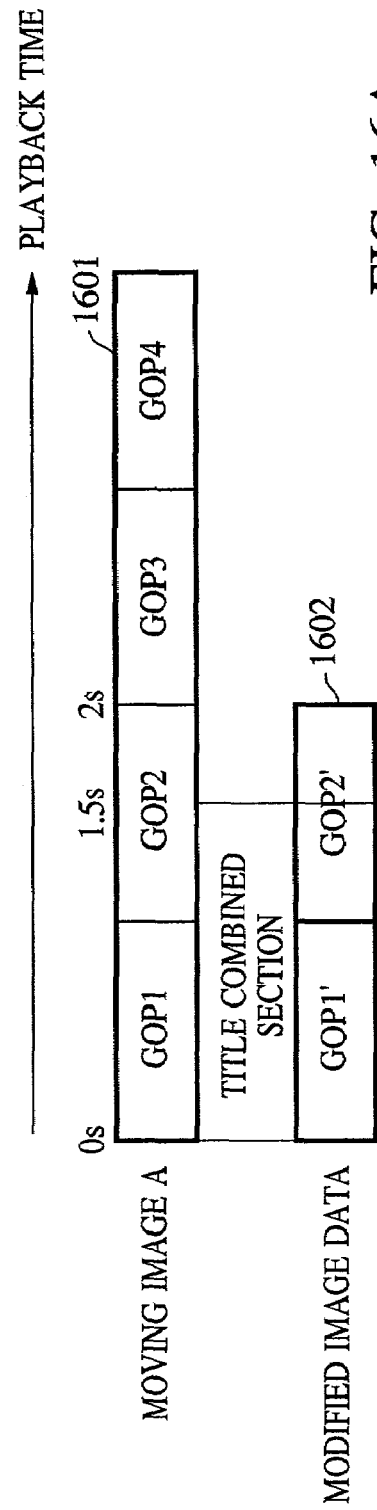
FIGS. 16A-16C illustrate playback timings of moving image data according to the playback description data.

In FIG. 15, the data is recorded in a recording medium 1501 such as an opto-magnetic disk. A moving image A 1502 is a material moving image data file. Modified information data 1503 is a moving image data file which contains a picture obtained by modifying the moving image A 1502 as a material picture. FIG. 16A shows the relationship between the moving image data A and the modified information data when the moving image data A has been provided with a title combining processing.

Figure 16B:
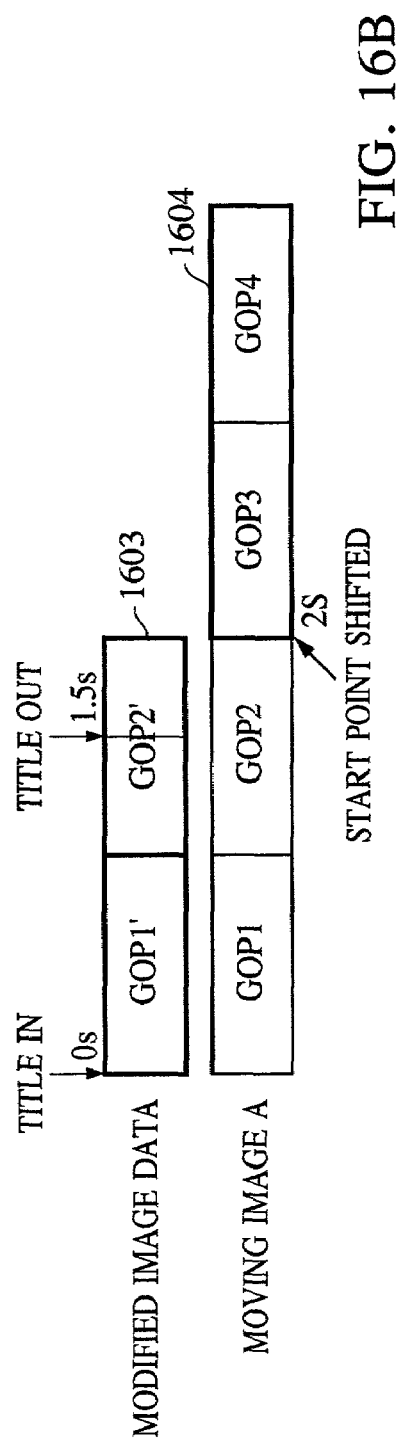
Figure 16C:
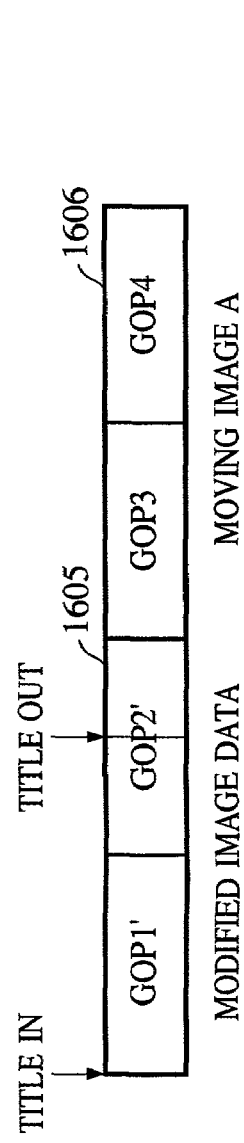

Moving data A 1601 is divided into predetermined encoding units (GOP1-GOP4). It is desirable that in moving image data with such encoding units, the playback start point of the data is aligned with the boundary of the GOPs, in order to obtain a smooth playback moving image. The picture where the title texts have been combined for 1.5 seconds from the start of the moving image data A 1601 corresponds to the hatched portion of modified information data 1602. While the title combined section of the modified information data 1602 is from 0 s to 1.5 s, as shown in FIGS. 16A-16C, the data of the section from the start to 1.5 s-2 s of the modified information data 1602 is identical to that of the material moving image data A 1601, so that alignment with the boundary between the GOPs is achieved, as mentioned above.

Namely, the portion of 0 s to 1.5 s of the modified information data 1602 indicates the picture of combined title, while the portion of 1.5 s to 2 s indicates the picture for GOP alignment, which is identical to the picture of the material moving image data A.

Numeral 1504 of FIG. 15 designates playback description data describing a playback procedure for the moving image data A and the modified information data. Numeral 1505 designates a modified information data object for designating the modified information data 1503 in the playback description data 1504. Numeral 1506 designates a moving image object designating the moving image data A 1502. Numerals 1508, 1509 and 1510 designate modified information data ID information, playback time designation information and time designation restoration information, respectively, as described in the previous embodiments.

FIG. 17 shows excerpts of examples of descriptions of the modified information data object 1505 and the moving image object 1506, where the playback description scheme known as SMIL is used. In this figure, the row designating "title.mpg" is the modified information data object, and the row designating "A.mpg" is the moving image object. It is to be noted that FIG. 17 shows only excerpts of relevant portions and does not show the entire SMIL syntax.

FIG. 16B shows the chronological relationship on the playback description data. The modified information data 1603="title.mpg", which precedes in the description, is played back from 0 s to 2 s, followed by the playback of the moving image data A 1604="A.mpg" from 2 s after the start (GOP3). This is because of the addition of the description element clipBegin="2 s" as the playback time designation information 1509 in "A.mpg" in FIG. 17. As mentioned above, since there is provided the picture section for GOP alignment after the title combined section in the modified information data, a smooth transition can be achieved from the modified information data 1605 to the moving image data A 1606, as shown in FIG. 16C, when transitioning from the GOP2' of the modified information data 1603 to the GOP3 of the moving image data A 1604.

Numeral 1507 of FIG. 15 designates time section information which is a characteristic feature of the present embodiment. The time section information 1507 is recorded by using a description element within the playback description data which is directed toward the modified information data object. The time section information 1507 is information indicating the section of the modified information data 1503 where there is the actual modification processing provided. It indicates, for example, the timing of TITLE IN and TITLE OUT in FIG. 16B.

In the specific example of FIG. 17, the time section information 1507 is described as "title:0 s:1.5 s", together with the title attribute indicating the title, as an attribute value of the description element rclipFor of the modified information data ID information 1508 indicating the modified information data. By referring to rclipFor="title:0 s:1.5 s" of FIG. 17, it can be known that the moving image file designated by title.mpg is the title-combined modified information data and that the title combined section is from 0 s to 1.5 s.

Hereafter, the processing in the image processing unit 101 in response to the editing instruction will be described. While in the first and second embodiments, the processing for modifying the playback description data was performed by the CPU 111, the playback description data processing function is provided to the image processing unit 101 in the present embodiment.

Figure 18:
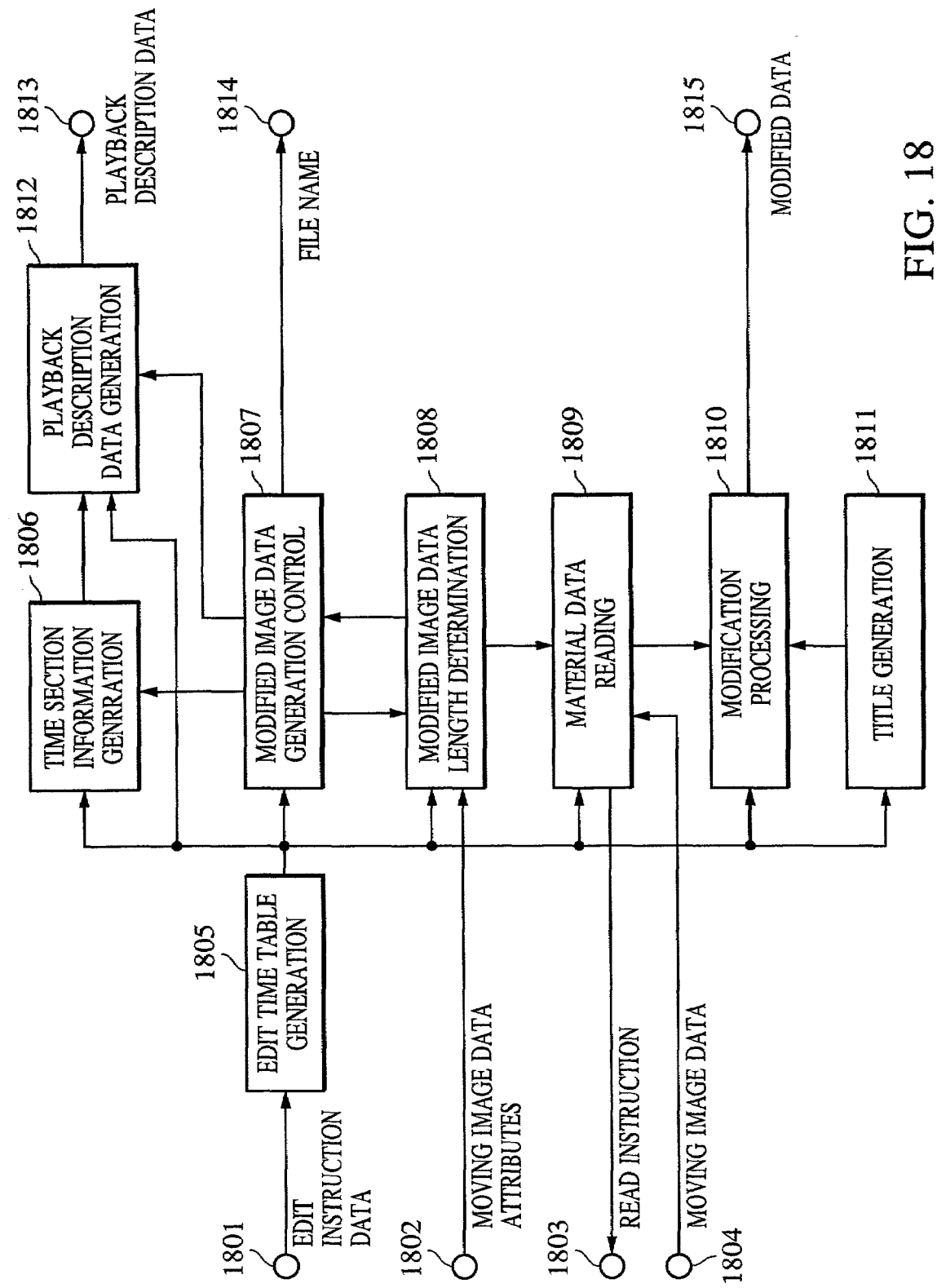
FIG. 18 is a block diagram of a main portion of an image processing unit.

FIG. 18 shows the structure of a main portion of the image processing unit 101.

In FIG. 18, edit instruction data is input to a terminal 1801. The data includes the start and end time of the individual moving image, stationary picture and audio data used as well as the title combined time. An edit time table generating circuit 1805 analyzes these edit data and generates a time table for generating the playback description data. A modified information data generation control circuit 1807 determines time table elements for which modified information data generation is necessary, based on the time table, and controls the generation processing for the modified information data. In the present embodiment, the generation processing is controlled such that modified information data is generated for a section in which title combination is designated on the time table. The modified information data generation control circuit 1805 also decides on the name of modified information data.

A modified information data length determination circuit 1808, under the control of the modified information data generation control circuit 1805, determines an actual modified information data length based on the title combined section in the time table and the attribute information about material moving image data supplied from the terminal 1802. In the title combination example described with reference to FIGS. 16A-16C, the title combined section is 1.5 s, as shown in FIG. 16A, and the next editable data boundary, including the title combination section, according to the attribute information of the moving image data A 1601 as the material moving image data, is the end point 2 s of the GOP2. Accordingly, the modified information data length determination circuit 1608 in this case determines that the modified information data length is 2 s.

A material data reading circuit 1809 instructs the storage unit 103 via the terminal 1803 to read a corresponding moving image data portion according to the modified information data length determined by the modified information data length determination circuit 1808, while controlling the internal CODEC of the image processing unit 101 to decode the image data thus read out. The decoded material data is read via the terminal 1804 and outputted to a modification processing circuit 1810. In the example of FIG. 16A, the GOP1 and GOP2 of the moving image data are read from the storage unit 103 and supplied to the modification processing circuit 1810 after decoding.

A title generation circuit 1811 generates the designated title data according to the edit time table and outputs it to the modification processing circuit 1810.

The modification processing circuit 1810 merges the text data which was generated in a title generation circuit 1811 and which indicates the title picture, with the material image data from the material data reading circuit 1809, thereby creating the modified information data. The modified information data thus created is outputted to the internal CODEC via the terminal 1815, encoded, and then outputted to the storage unit 103. The modified information data generation control circuit 1807 outputs the information about the file name of the modified information data to the storage unit 103, which in turn generates modified information data file containing the encoded modified information data according to the file name and stores it.

A playback description data generation circuit 1812, which generates from the time table the playback description data known as SMIL, for example, shifts the playback start point of the material moving image data A, under the instruction of the modified information data generation control circuit 1807. This is in order that the above-mentioned modified information data is played back during the title combined section. At the same time, the modified information data object 1505 is also added. Numeral 1806 designates a time section information generation circuit which, under the control of the modified information data generation control circuit 1807, generates, from the title combined section information in the time table, the time section information 1507 indicating the modified information data section, and outputs it to the playback description data generation circuit 1812.

The playback description data generation circuit 1812 incorporates the playback time designation information 1509 and the time designation restoration information into the moving image object 1506, while incorporating the time section information 1507 to the modified information data object 1505. In the example of FIGS. 16A-16C, 0 s:1.5 s in the description element rclipFor="title:0 s:1.5 s" corresponds to the time section information 1507. At the same time, a "title" attribute indicating the attribute of the modified information data is incorporated. The playback description data after the incorporation of the time section information is outputted via the terminal 1813 to the storage unit 103 as a playback description data file and stored therein. The processing of the modified information data object 1505 and that of the moving image data object 1506 can be executed according to the flowchart of FIG. 2 and, in addition, the processing for adding the time section information 1507 to the modified information data object 1505 is performed in the present embodiment.

Hereafter, the display operation of the display unit 107 in a case where editing is performed while confirming the content of the thus generated playback description data will be described.

Figure 19:
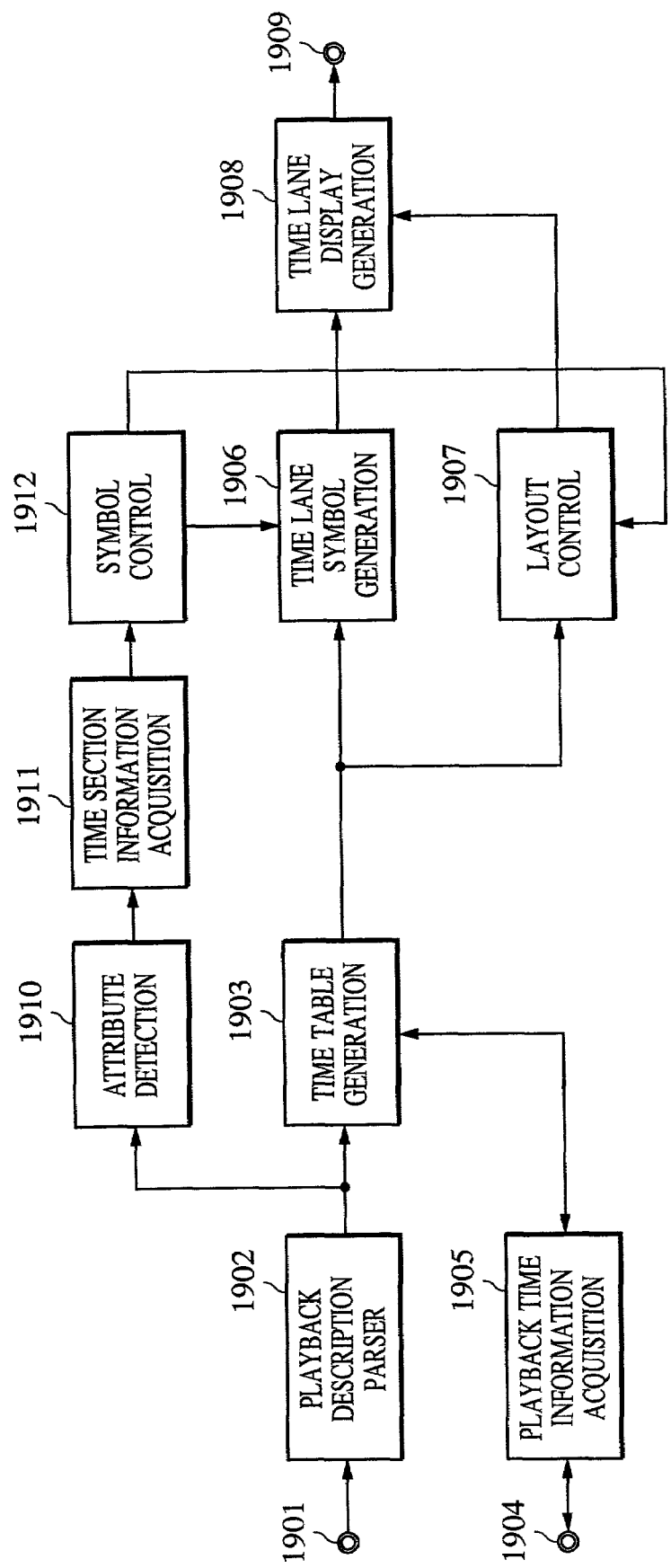
FIG. 19 is a block diagram of a main portion of a display control unit.

FIG. 19 shows the structure of the display control circuit 105 as far as the processing of the playback description data is concerned.

Figure 20:
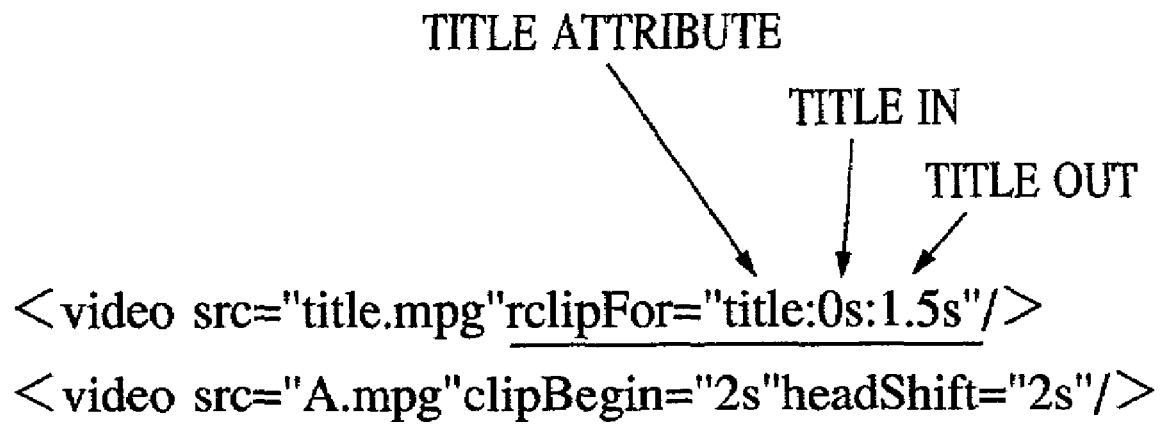
FIG. 20 shows the playback description data.
Figure 21A:
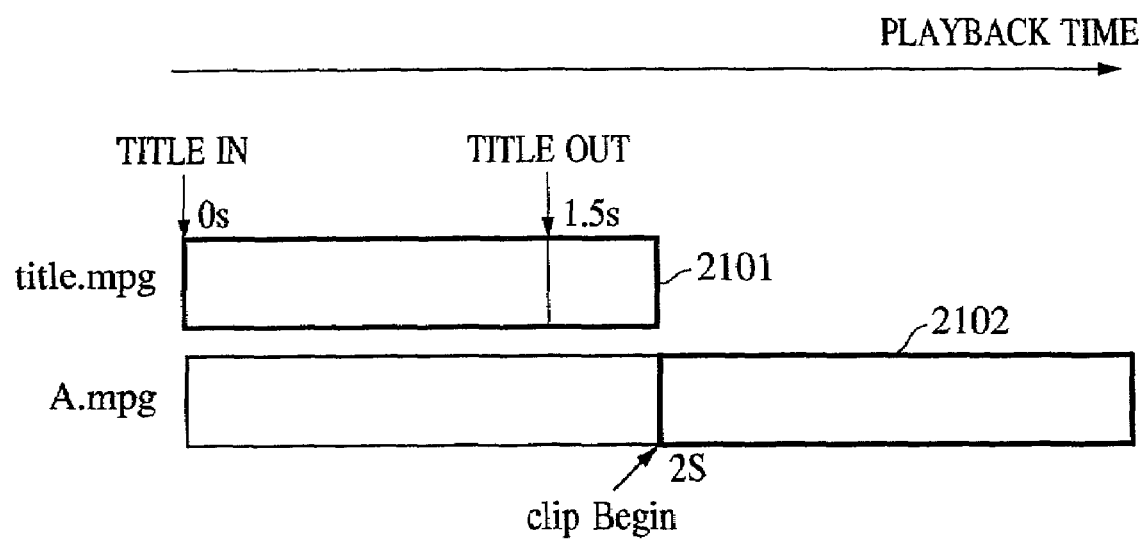
FIGS. 21A and 21B illustrate the operation of displaying the playback description data.

FIG. 20 shows an excerpt of a portion of the playback description data generated as a result of the generation of the title-combination indicating modified information data, the excerpt relating to the description of the moving image object. As mentioned above, while title.mpg and A.mpg are played back successively, title.mpg is the modified moving image data containing the picture of the title merged portion where titles have been combined from the head of A.mpg to 1.5 seconds later. A description element rclipFor is incorporated into the modified information data object on the first row of FIG. 20 designating title.mpg, the rclipFor functioning as the modified information data ID information identifying the modified information data object. As the values of the modified information data ID information rclipFor, the time section information "0 s:1.5 s" is described, together with the designation of modification type "title" indicating the title combination. The respective values indicate the time of TITLE IN and TITLE OUT in the modified information data. FIG. 21A shows the playback time table corresponding to the playback description data.

As the operating unit 109 gives out an instruction for editing the playback description data, the CPU 111 reads the designated playback description data file from the storage unit 103 and outputs it to the display control unit 105. In FIG. 19, numeral 1902 designates a playback description parser circuit which analyzes the syntax of the playback description data input from a terminal 1901 and thereby extracts the individual moving image objects.

Numeral 1903 designates a time table generation circuit which generates, from the playback time of the individual moving image objects analyzed in the playback description parser circuit 1902, a time table for the playback of the moving image data designated by the individual moving image objects.

A playback time information acquisition circuit 1905, in response to an instruction from the time table generation circuit 1903, obtains from the storage unit 103 the addition information about the individual moving image data files designated via the terminal 1904, and acquires the playback time information of the individual moving image objects from the addition information of the individual moving image data. The entries of the generated time table are successively sent to a time lane symbol generation circuit 1906, where they are converted into symbol images representing moving image data on the edit screen using the time lane display. A layout control circuit 1907 controls the time lane display generation circuit 1908 such that there can be obtained a layout which is adapted to the start time and length of the individual moving image objects in the time table, whereby the time lane is displayed.

An attribute detection circuit 1910 detects a modified information data object whose attribute is a title combination, based on the modified information data ID information added to the modified information data object in the playback description data. A time section information acquisition circuit 1911 detects the time section information from the modified information data object from which the title attribute has been detected, and acquires the time information about the section of the modified information data designated by the modified information data object in which the modification processing is provided, i.e., about the TITLE IN and TITLE OUT in the present embodiment. Based on this time section information, a symbol control circuit 1912 controls the time lane symbol generation circuit 1906 such that it generates not the normal moving image symbol but a time lane symbol indicating the title, with regard to the modified information data object from which the title attribute has been detected.

Figure 21B:
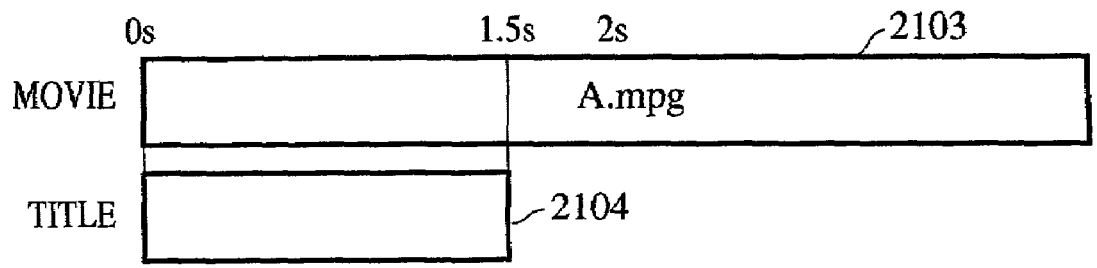

At the same time, the symbol control circuit 1912 controls the layout control circuit 1907 such that the playback section in which the moving image data A is substituted by the title moving image object is modified to the display format in which the original moving image data A is played back. Referring to FIG. 21, this can be realized by disregarding the playback time designation information clipBegin="2 s" of A.mpg, which is added for substitution with title.mpg. Further, by displaying the title.mpg not in the movie time lane but in the title time lane in the layout control circuit 1907, the display of FIG. 21B becomes possible.

Thus, in the present embodiment, the data which is played back as in FIG. 21A according to the playback description data is displayed as in FIG. 21B during the display of the playback description data by using the title attribute and the time section information.

Thus in the present embodiment, when the playback procedure is controlled by designating the modified information data by the playback description data, the time section information indicating the section of the modified information data where the modification processing is provided is additionally recorded in the playback description data.

During the editing by using the playback description data, the section of the modified information data in which the modification has been actually provided is recognizably timelane displayed according to the time section information. Thus, the user can easily recognize the period when the modification is actually provided even when a playback processing including the modified information data is instructed by the playback description data, so that the editing efficiency can be improved.

While in the present embodiment the modified information data was processed in units of the length of the GOPs, which are the encoding units of MPEG, other units of length may be used, and the present invention may be applied to cases where the modified information data is processed according to effects other than the title combination.

Figure 22A:
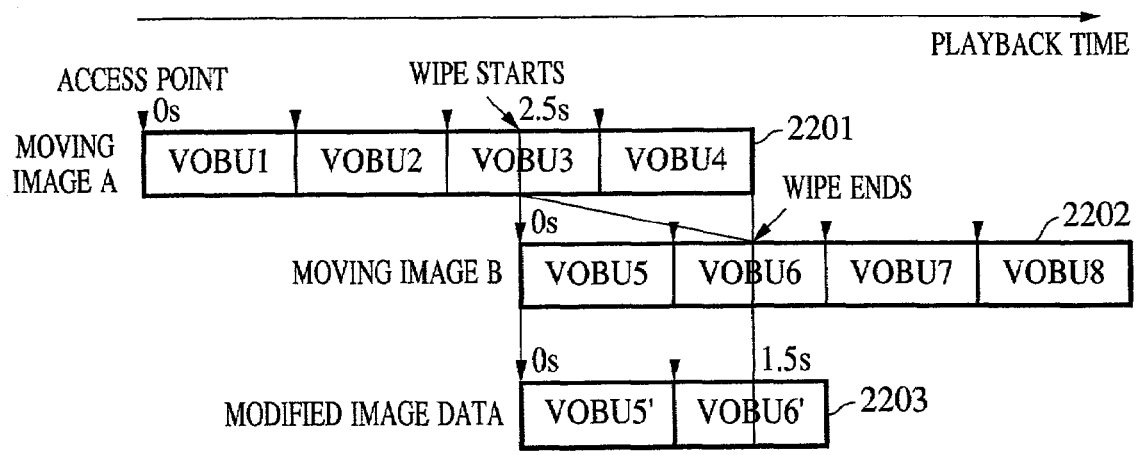
FIGS. 22A-22C illustrate playback timings of moving image data according to the playback description data.

FIG. 22A shows the example where a transitional effect is added when the playback is switched from moving image data A to B.

The moving image data A 2201 and B 2202 are divided in predetermined processing units (VOBU1-VOBU4, VOBU5-VOBU8). Those processing units may be access units on a medium such as VOBUs in DVD video technology. In a moving image medium with such access units, it is desirable that the data playback start point is coincided with VOBUs to ensure a smooth playback operation. In the following, a fourth embodiment of the present invention will be described in which the modified information data is processed by using VOBUs as the processing units. In the present embodiment, too, the editing apparatus of FIG. 1 is used.

The gray portion of modified information data 2203 corresponds to the picture to which a transitional effect has been provided, where the moving image data A 2201 transitions from 2.5 seconds after its start to the moving image data B 2202 via a 1.5 second wipe effect. The wipe section is from 0 s to 1.5 s, as shown, but the modified information data 2203 has recorded therein from 1.5 s to 2 s a picture identical to that of the material moving image data B 2202 during the same section, so that alignment with the boundary of the next VOBU is achieved, as explained above. Thus, the section from 0 s to 1.5 s of the modified information data is the wipe picture from the moving image data A 2201 to B 2202, and the section 1.5 s to 2 s is the picture identical to that of the material moving image data B 2202 for VOBU alignment.

FIG. 23 shows an example of the playback description data for a moving image playback to which a wipe effect is applied by describing the playback procedure for the moving images A and B and modified information data by SMIL. The row designating "trans.mpg" is the modified information data object, and the rows designating "A.mpg" and "B.mpg" are the moving image objects. It should be noted that FIG. 23 shows only an excerpt of a relevant portion and does not show the entire syntax of SMIL.

Figure 22B:
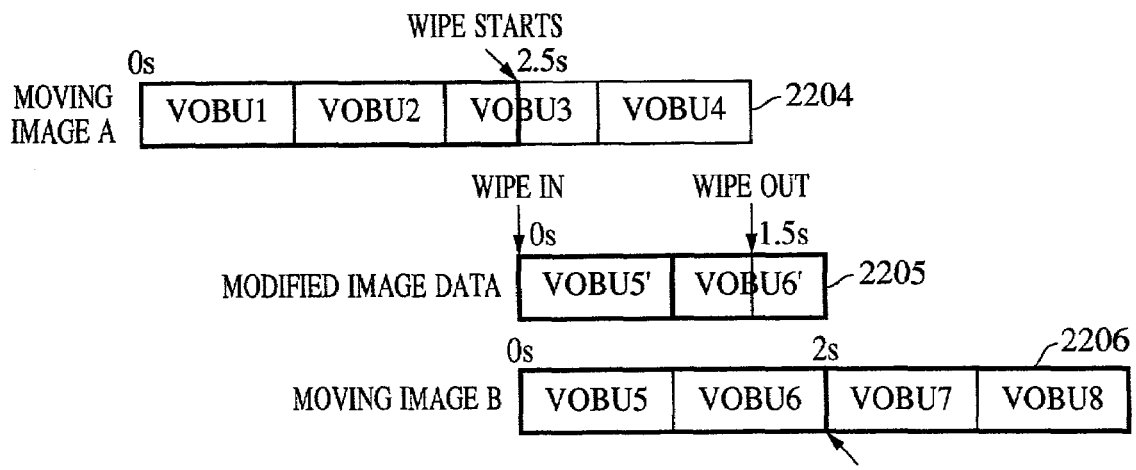

FIG. 22B shows the chronological relationship on the playback description data. Moving image data A 2204 which precedes in the description is played back from 0 s to 2.5 s, and thereafter modified information data 2205="trans.mpg" is played back from 0 s to 2 s, followed by the moving image data B 2206 which is played back two seconds from start (VOBU7).

Figure 22C:
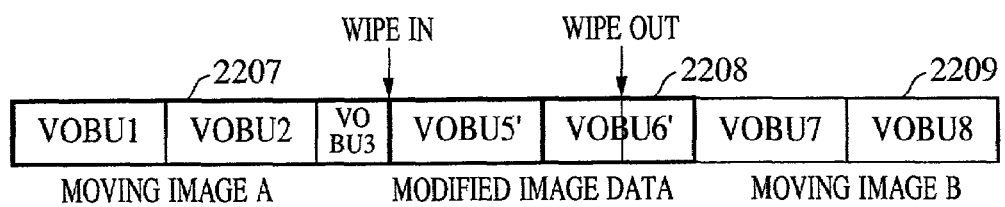

This is because of the start point shifting clipBegin="2 s" designated in "B.mpg" in the example of FIG. 22. When shifting from VOBU6' of modified information data 2205 to VOBU7 of the moving image data B 2206, since the modified information data 2205 has the picture section for the VOBU alignment after the wipe section, as mentioned above, a smooth transition can be obtained from the moving image data A 2207 to modified information data 2208 to moving image data B 2209, as shown in FIG. 22C.

In the present embodiment, too, the time section information is recorded in the playback description data by means of a description element directed to the modified information data object.

In the description example of FIG. 23, the time information corresponding to WIPE IN and WIPE OUT in FIG. 22B is described as "wipe:0 s:1.5 s" as an attribute value of the description element rclipFor of the modified information data ID information identifying the modified information data, together with the transition attribute indicating the wipe effect. By referring to rclipFor="wipe:0 s:1.5 s" of FIG. 23, it can be known that the moving image file designated by trans.mpg is the modified information data in which the wipe effect has been applied and that the wipe section is from 0 s to 1.5 s.

Even when the VOBUs are thus treated as the encoding units and the modified information data is processed by adding the transitional effect between the two items of moving image data, the processing by the editing apparatus of FIG. 1 can be performed in the same manner as in the case of using the GOPs as the processing units.

Hereunder, the processing performed in the image processing unit 101 in the present embodiment will be described.

The following description concerns the case where two items of moving image data A and B which are in units of VOBUs are switched via a wipe effect, as shown in FIG. 22.

In FIG. 18, edit instruction data is input to the terminal 1801. This data includes the start and end time of the individual moving image, static picture and audio data and, additionally in the present embodiment, the time for the application of a transition such as an effect or a wipe.

The time table generation circuit 1805 analyzes the edit instruction data and generates a time table for the generation of the playback description data. The modified information data generation control circuit 1807, based on this time table, determines the time table elements for which modified information data must be generated and controls the generation of the modified information data. In the present embodiment, the control is performed such that the modified information data is generated for the section for which the application of an effect or transition is designated on the time table. The modified information data generation control circuit 1807 also decides on the name of the generated modified information data.

The modified information data length determination circuit 1808, under the control of the modified information data generation control circuit 1807, determines the length of the actual modified information data based on the effect or transition applied section on the time table and on the attribute information of the moving image data supplied from the terminal 1802. In the example of FIG. 12 where the transition is applied, the applied section is from 2.5 s of the moving image data A and to 1.5 s of the moving image data B, as shown in FIG. 22A. It can be seen from the attribute information of the modification processing circuit B 2202, which is the material moving image data, that the next editable data boundary inclusive of the wipe applied section is the point of 2 s of the moving image data B, i.e., the end point of the VOBU6. Accordingly, in this case, the modified information data length determination circuit 1808 decides that the modified information data length is 2 s.

The material data reading circuit 1809 instructs the storage unit 103 via the terminal 1803 to read the moving image data of the moving image data A and B including the wipe applied period, according to the modified information data length determined by the modified information data length determination circuit 1808. At the same time, the material data reading circuit 1809 decodes the thus read-out image data by the internal CODEC, reads the decoded material data from the terminal 1804 and outputs it to the modification processing circuit 1810. In FIG. 22A, the VOBU3-VOBU4 of the material moving image data A 2201 and the VOBU5-VOBU6 of the moving image data B 2202, which are necessary for the generation of the modified information data 2203, are read out of the storage unit 103 and supplied to the modification processing circuit 1810.

The modification processing circuit 1810, according to the edit time table, merges the thus read image data A and B via a wipe effect, thereby creating the modified information data. The modified information data is then output to the storage unit 103 via the terminal 1815. The modified information data generation control circuit 1807 outputs the information about the file name of the modified information data to the storage unit 103, which generates a modified information data file including the encoded modified information data according to the file name and stores it.

The playback description data generation circuit 1812 shifts the playback end point of the moving image data A and the playback start point of the moving image data B according to the instruction from the modified information data generation control circuit 1804, such that the modified information data is played back during the wipe applied section. The playback description data generation circuit 1812 further incorporates a modified information data object.

The time section information generation circuit 1806, according to the edit table and the instruction from the modified information data generation control circuit 1807, generates time section information indicating the time of WIPE IN and WIPE OUT of FIG. 22B and outputs it to the playback description data generation circuit 1812. The playback description data generation circuit 1812 incorporates this time section information into the modified information data object. This corresponds to the 0 s:1.5 s of the description element rclipFor="wipe:0 s:1.5 s" in the description example of FIG. 23.

At the same time, the "wipe" attribute indicating the attribute of the modified information data is added, and the playback time designation information and time designation restoration information are added to the data objects designating the moving images A and B. The playback description data to which the time section information has been added is output to the storage unit 103 via the terminal 1813 and stored as a playback description data file.

Hereafter, the display operation of the display unit 107 when an editing is performed while confirming the content of the playback description data generated according to the instruction of a transition effect will be described.

FIG. 19 shows the structure of the display control circuit 107 of FIG. 1 concerning the processing of the playback description data.

FIG. 24 shows an excerpt from the playback description data generated as a result of the generation of the modified information data with the aforementioned transitional effect, the excerpt relating to the description of the moving image object. As mentioned above, while A.mpg, trans.mpg and B.mpg are played back successively, trans.mpg is the modified information data including the wipe effect portion of the picture in which a wipe effect is provided from the start of B.mpg to 1.5 seconds later. The data object on the second row of FIG. 24 which designates trans.mpg has incorporated thereto a description element rclipFor as attribute information indicating that this is a modified information data object. As the value of the attribute information rclipFor, there is described the time section information "0 s:1.5 s", together with the designation of the modification type "wipe" denoting the wipe effect. The respective numbers indicate the time of WIPE IN and WIPE OUT, respectively, in the modified information data. FIG. 25A shows the playback time table corresponding to the playback description data.

As the operating unit 115 provides an editing instruction for the playback description data, the CPU 111 reads the designated playback description data file from the storage unit 103 and outputs it to the display control unit 105. In FIG. 19, the playback description parser circuit 1902 analyzes the syntax of the playback description data inputted from the terminal 1901 and extracts the individual moving image objects. The time table generation circuit 1903 generates from the playback time of the individual moving image objects analyzed by the playback description parser circuit 1902 a time table for the playback of moving image data designated by the individual moving image objects.

In response to a demand from the time table generation circuit 1903, the playback time information acquisition circuit 1905 obtains from the storage unit 103 the addition information in the individual moving image data files designated via the terminal 1904, and acquires from the added information of the individual moving image data the playback time information of the individual moving image objects. The entries of the generated time table are successively sent to the time lane symbol generation circuit 1906, where they are converted into symbol images representing the moving image data on the editing screen using the time lane display. The layout control circuit 1907 controls the time lane display generation circuit 1908 such that the layout is adapted to the start time and length of the individual moving image objects within the time table, whereby the time lane is displayed.

The attribute detection circuit 1910, based on the modified information data ID information added to the modified information data object in the playback description data, detects the modified information data object whose attribute is the effect attribute. The time section information acquisition circuit 1911 detects the time section information added to the modified information data object for which the effect attribute has been detected, and acquires the section in which the modification processing is provided, i.e., the time information about WIPE IN and WIPE OUT in the present embodiment. Based on this time section information, the symbol control circuit 1912 controls the time lane symbol generation circuit 1906 such that, as to the moving image object from which the effect attribute has been detected, a time lane symbol indicating the effect is generated instead of the normal moving image symbol.

At the same time, the symbol control circuit 1912 controls the layout control circuit 1907, whereby the playback section of the original moving image data where the data is substituted by the modified information data is modified to the display format in which the original moving image is played back. In FIG. 25A, this can be realized by disregarding the playback time designation information clipEnd="2.5 s" of A.mpg and the playback time designation information clipBegin="2 s" of B.mpg, which are added for the substitution with trans.mpg2502. Further, the display of FIG. 25B can be realized by displaying title.mpg not on the time lane of the movie but on the time lane of the effect in the layout control circuit 1907.

Thus, in the present embodiment, the data played back as shown in FIG. 25A during the playback by the playback description data is displayed on the edit time lane as shown in FIG. 25B when the playback description data is displayed, using the title attribute and the time section information.

Thus, in the present embodiment, when the playback procedure is controlled by designating the modified information data by the playback description data, the time section information indicating the section of the modified information data in which the modification processing is provided is additionally recorded in the playback description data.

During the editing using the playback description data, the section of the modified information data where the modification has been actually provided is recognizably time-lane displayed according to the time section information. Therefore, the user can easily recognize the period where the modification has actually been provided even when the playback description data indicates a playback processing including the modified information data, so that the editing efficiency can be improved.

While in the third and fourth embodiments, the time section information was added in the playback description data, other arrangements can be used.

Figure 26:
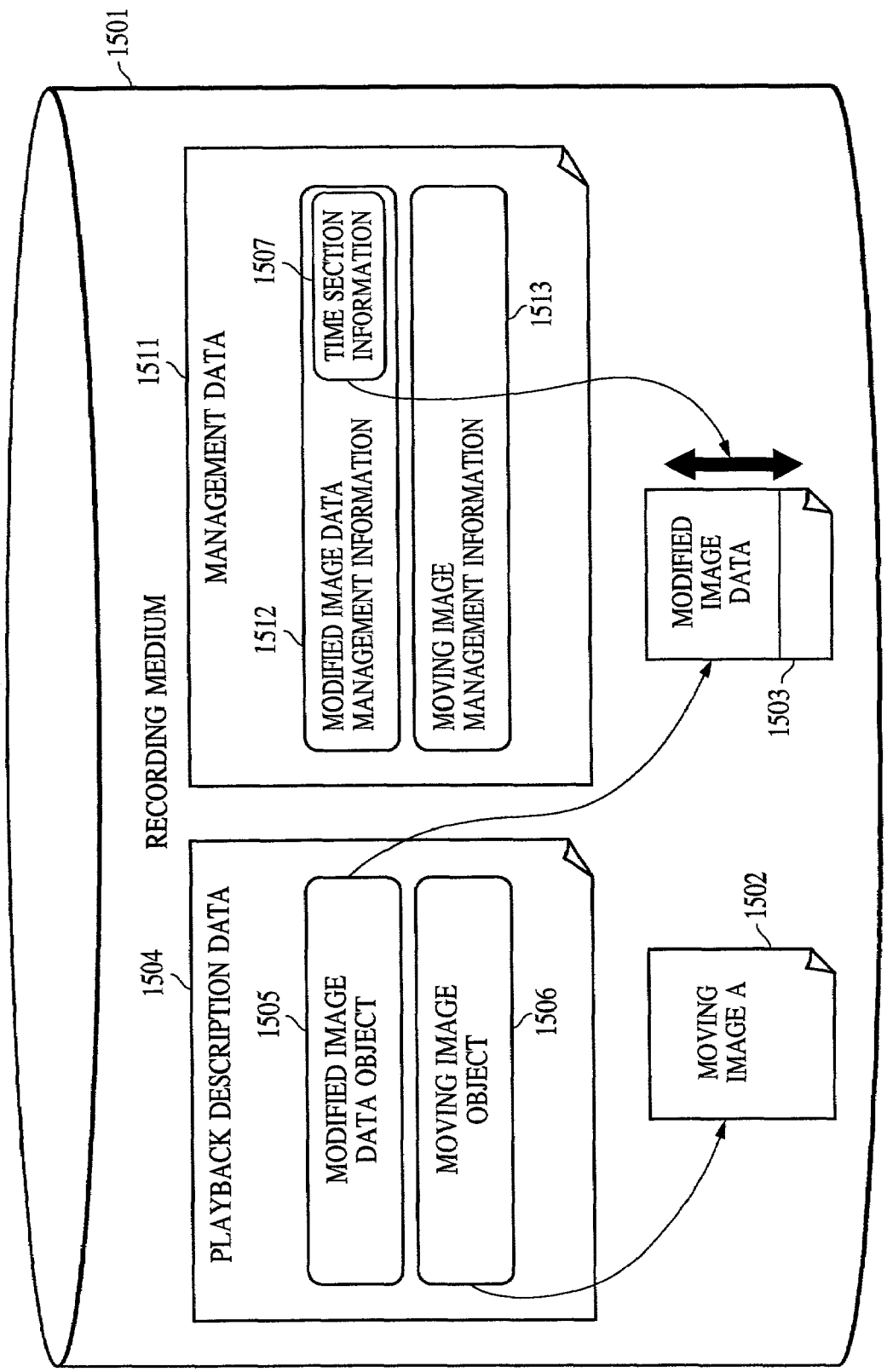
FIG. 26 illustrates a state of data processed in an embodiment of the present invention.

FIG. 26 shows another example of recording of the time section information. In FIG. 26, components similar to those of FIG. 15 are designated by similar numerals. The moving image data A 1502 is a material moving image data file, and the modified information data 1503 is a moving image data file including the picture obtained by modifying the moving image data A 1502 as material picture.

Numeral 1504 designates the playback description data, numeral 1505 designates the modified information data object designating the modified information data 1503, and numeral 1506 designates the moving image object designating the moving image data A 1502. In contrast to FIG. 15, the time section information 1507 is not added to the playback description data 1501.

Numeral 1511 designates management data for managing the data recorded in the recording medium 1501, and it includes modified information data management information 1512 relating to the modified information data 1503 and moving image management information 1513 relating to the moving image data A 1502. The individual management information comprises a reference count about the data referenced by the playback description data and classification group information, for example.

Numeral 1507 designates time section information indicating the actual title combined section of the modified information data 1503. The time section information 1507 is recorded in the management data 1511.

Figure 27:
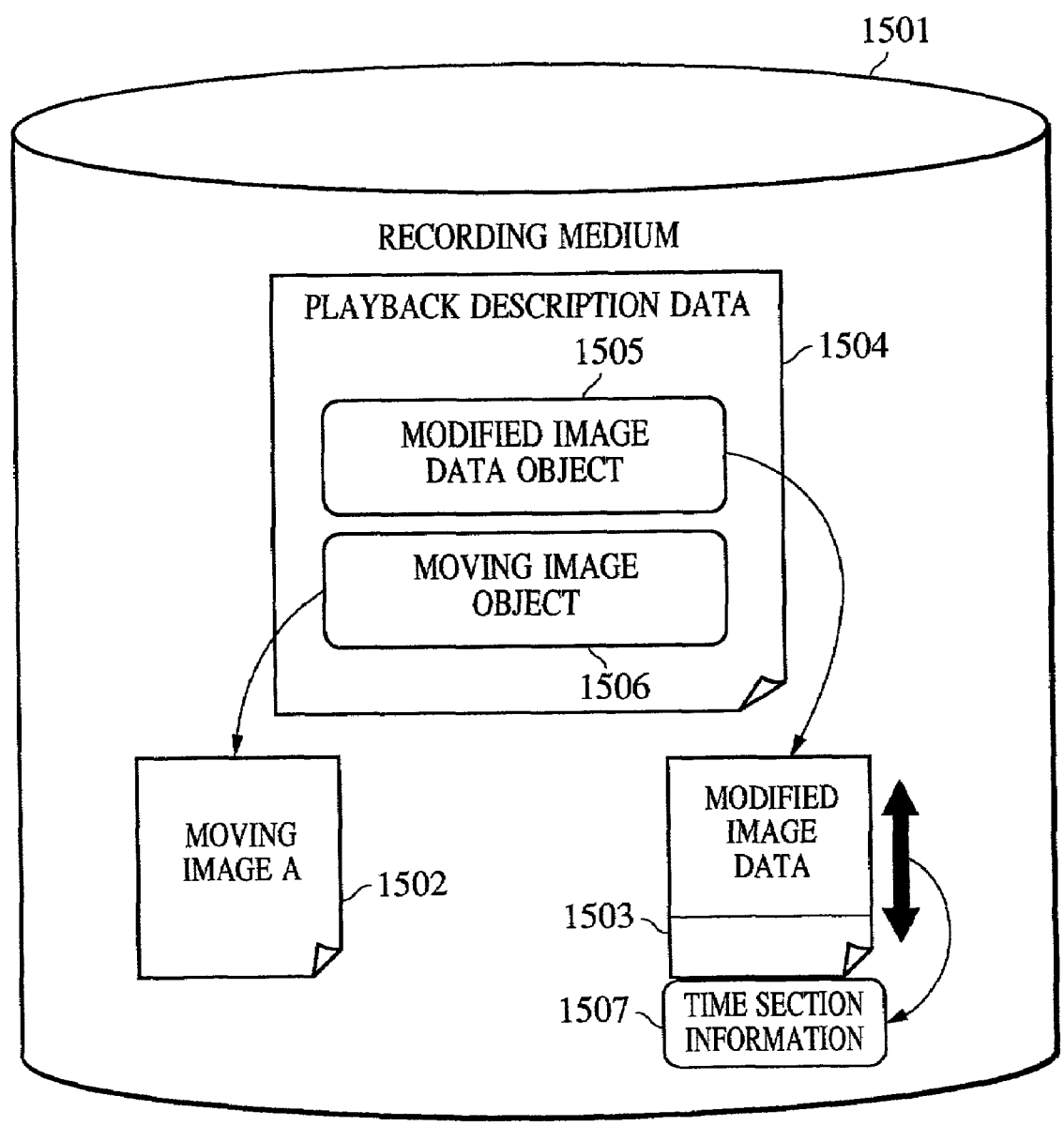
FIG. 27 illustrates a state of data processed in the embodiment of the present invention.

FIG. 27 shows yet another example of the time section information, where components similar to those of FIGS. 15 and 26 are designated by similar numerals.

In FIG. 27, the time section information 1507 is recorded in the moving image data file of the modified information data 1503 as additional information. An example of the location within the moving image file for the recording is the MPEG2 private header. By referring to the time section information recorded in the additional information of the moving image file, the title combined section or the wipe section in the modified information data moving image file can be known, as in the previous embodiments.

While in the above-described embodiments, the information about the start point and end point of the data actually modified in the modified information data were recorded as the time section information, other information such as those about the start point and its duration, or those about the end point and its duration, may be recorded.

While in each of the above-described embodiments, the program data was described by SMIL, the description can be made by other languages such as XML (extensible Markup Language), SGML (Standard Generalized Markup Language), and HTML (Hyper Text Markup Language).

While in the present embodiment the processing for the decoding and combining, for example, of the image or audio data were realized by hardware, it may be realized by software using a microcomputer.

In this case, the program codes of the software themselves will realize the functions of the above-mentioned embodiments, and the program codes themselves and the means for supplying them to the computer, such as a storage medium storing the program codes, will constitute the present invention. The storage medium for storing such program codes may include a floppy disk, hard disk, optical disk, magneto-optical disk, a CD-ROM, magnetic tape, non-volatile memory card and a ROM.

When not only the descriptive functions are realized in the above-mentioned embodiments by having the computer execute the supplied program codes, but the functions described in the above-mentioned embodiments are realized by the program codes working in association with the OS (operating system) running the computer or other application software, the program codes are included in the scope of the present invention.

Furthermore, the present invention includes the cases where the supplied program codes are stored in a function extension board of the computer or in a memory provided in a function extension unit connected to the computer, and then, based on the instructions by the program codes, the function extension board or the CPU provided in the function extension unit perform part or all of the actual processing, whereby the functions of the above-mentioned embodiments are realized.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording apparatus comprising:

description data generating means for generating playback description data indicating a playback procedure of a plurality of items of information data and modified information data which is obtained by performing a modification processing on the information data designated in the playback procedure indicated by the playback description data such that at least one of the plurality of items of information data and the modified information data are reproduced in an appropriate order, the modified information data having a non-modified section on which the modification processing is not performed and a modified section on which the modification processing is performed;

section information generating means for generating section information discriminating the modified section from the non-modified section in the modified information data by a start time or an end time, a length of the non-modified section being changed according to the start time or end time; and recording means for recording the playback description data and the section information on a recording medium where the plurality of items of information data and the modified information data are recorded.

2. An apparatus according to claim 1, wherein the section information is recorded by being incorporated into the playback description data.

3. An apparatus according to claim 1, wherein the information data includes image data, the modification processing includes a special effect processing on the image data, and the start time or end time of the section information corresponds to the special effect processing within the modified information data.

4. An apparatus according to claim 1, wherein the information data includes image data, the modification processing includes a combining processing for combining the image data and other data, and the start time or end time of the section information corresponds to the combining processing within the modified information data.

5. An apparatus according to claim 1, wherein the information data is encoded, the modified information data is generated by using the encoding units as processing units, and the section where the modification processing is performed is determined independently of the processing units.

6. An apparatus according to claim 1, wherein the modified information data is generated by using the access units of a recording medium in which the information data is recorded, and the section where the modification processing is performed is determined independently of the processing units.

7. An apparatus according to claim 1, further comprising a display control means for displaying in a display unit, based on the section information, an image representing the section of the modified information data where the modification processing has been performed.

8. A data processing method comprising:

a description data generating step, of generating playback description data indicating a playback procedure for a plurality of items of information data and modified information data which is obtained by performing a modification processing on the information data designated in the playback procedure indicated by the playback description data such that at least one of the plurality of items of information data and the modified information data are reproduced in an appropriate order, the modified information data having a non-modified section on which the modification processing is not performed and a modified section on which the modification processing is performed;

a section information generation processing step, of generating section information discriminating the modified section from the non-modified section in the modified information data by a start time and an end time, a length of the non-modified section being changed according to the start time or end time; and a recording step, of recording the playback description data and the section information on a recording medium where the plurality of items of information data and the modified information data are recorded.

* * * * *